US010094373B2

(12) United States Patent
Hikichi et al.

(10) Patent No.: US 10,094,373 B2
(45) Date of Patent: Oct. 9, 2018

(54) VALVE DEVICE OF COMPRESSOR, AND SEALED COMPRESSOR INCLUDING VALVE DEVICE

(71) Applicant: Panasonic Corporation, Kadoma-shi, Osaka (JP)

(72) Inventors: Takumi Hikichi, Osaka (JP); Yu Haraki, Osaka (JP)

(73) Assignee: PANASONIC CORPORATION, Osaka (JP)

( * ) Notice: Subject to any disclaimer, the term of this patent is extended or adjusted under 35 U.S.C. 154(b) by 34 days.

(21) Appl. No.: 15/644,376

(22) Filed: Jul. 7, 2017

(65) Prior Publication Data

US 2017/0306947 A1 Oct. 26, 2017

Related U.S. Application Data

(62) Division of application No. 14/239,947, filed as application No. PCT/JP2012/005064 on Aug. 9, 2012, now abandoned.

(30) Foreign Application Priority Data

| Aug. 24, 2011 | (JP) | 2011-182379 |
| Aug. 31, 2011 | (JP) | 2011-188407 |
| Nov. 1, 2011 | (JP) | 2011-239982 |

(51) Int. Cl.
*F04B 49/22* (2006.01)
*F16K 15/16* (2006.01)
(Continued)

(52) U.S. Cl.
CPC ............ *F04B 49/225* (2013.01); *F04B 17/03* (2013.01); *F04B 39/1066* (2013.01); *F16K 15/16* (2013.01); *Y10T 137/7895* (2015.04)

(58) Field of Classification Search
CPC .. F04B 49/225; F04B 39/023; F04B 39/1073; F04B 17/03; F04B 39/1066; F16K 15/16;
(Continued)

(56) References Cited

U.S. PATENT DOCUMENTS 2,000,883 A 5/1935 Cullen et al.
4,628,963 A * 12/1986 Ishijima ............... F04C 29/128
137/857
(Continued)

FOREIGN PATENT DOCUMENTS

CN 1061740 C 2/2001
JP 63055391 A 3/1988
(Continued)

OTHER PUBLICATIONS

Chinese Office Action, Jun. 16, 2015; Chinese Patent Application No. 2201280040983.0, with English translation of its Search Report (17 pages).

*Primary Examiner* — Patrick Hamo
*Assistant Examiner* — Joseph Herrmann
(74) *Attorney, Agent, or Firm* — Hamre, Schumann, Mueller & Larson, P.C.

(57) ABSTRACT

A valve device of a compressor of the present invention comprises a plate (17), a reed (21, 75), and a stopper (31), wherein the reed includes: an opening/closing section (60, 70), a fastened section (61, 71); and a joining section (62, 72), the opening/closing section, the fastened section and the joining section being arranged in a direction in which a symmetric axis extends; wherein in a portion of the joining section which is closer to the opening/closing section, a pair of portions (102, 112, 82, 86) of an outer periphery of each of one or two openings (63, 65, 73, 77) which are closest to both ends of the joining section are symmetric with respect to the symmetric axis so as to form a substantially-V-shape or substantially-U-shape, in a direction from the opening/
(Continued)

closing section toward the fastened section; and in a portion of the joining section which is closer to the fastened section, a pair of portions (103, 113, 83, 87) of the outer periphery of each of one or two openings which are closest to the both ends of the joining section are symmetric with respect to the symmetric axis so as to form a substantially-V-shape or substantially-U-shape, in a direction from the fastened section toward the opening/closing section.

8 Claims, 20 Drawing Sheets

(51) Int. Cl.
*F04B 17/03* (2006.01)
*F04B 39/10* (2006.01)

(58) Field of Classification Search
CPC ......... Y10T 137/7892; Y10T 137/7895; Y10T 137/7891–137/7894
See application file for complete search history.

(56) References Cited

U.S. PATENT DOCUMENTS

| | | | |
|---|---|---|---|
| 4,642,037 A | 2/1987 | Fritchman | |
| 4,712,583 A * | 12/1987 | Pelmulder | A61M 39/24 137/494 |
| 4,976,284 A * | 12/1990 | Hovarter | F04B 27/1009 137/512.4 |
| 5,110,272 A * | 5/1992 | Peruzzi | F04B 39/1073 137/856 |
| 5,209,260 A | 5/1993 | Baek | |
| 5,609,476 A * | 3/1997 | Kim | F04B 39/1073 137/855 |
| 5,672,821 A * | 9/1997 | Suzuki | G01F 1/684 138/42 |
| 5,720,601 A | 2/1998 | Tark et al. | |
| 5,785,508 A * | 7/1998 | Bolt | F04B 39/1073 137/855 |
| 6,932,115 B2 * | 8/2005 | Kim | F04B 39/1073 137/855 |
| 7,284,971 B2 | 10/2007 | Lee | |
| 2003/0095883 A1* | 5/2003 | Hauser | F04B 39/1073 417/569 |
| 2004/0231737 A1 | 11/2004 | Kim et al. | |
| 2009/0116985 A1 | 5/2009 | Matsumoto et al. | |

FOREIGN PATENT DOCUMENTS

| | | |
|---|---|---|
| JP | 2002005057 A | 1/2002 |
| JP | 2002039071 A | 2/2002 |
| JP | 2005503516 A | 2/2005 |
| JP | 2006161709 A | 6/2006 |
| JP | 4071711 B2 | 4/2008 |
| JP | 2009509076 A | 3/2009 |
| WO | 03025397 A1 | 3/2003 |

\* cited by examiner

VALVE DEVICE OF COMPRESSOR, AND SEALED COMPRESSOR INCLUDING VALVE DEVICE

TECHNICAL FIELD

The present invention relates to a valve device of a compressor and a sealed compressor including this valve device. Particularly, the present invention relates to a valve device of a compressor for use in a refrigeration cycle unit such as an air conditioner and a refrigerator, or an air compressor, and a sealed compressor including this valve device.

BACKGROUND ART

Conventionally, there has been proposed a technique for improving an energy efficiency when a valve body opens and closes an opening of a compressor.

For example, in a sealed compressor disclosed in Patent Literature 1, a discharge valve opens and closes a passage penetrating a compression chamber and a discharge chamber. The discharge valve is provided with an elastic reed which is bent to bias the discharge valve in a direction to open the discharge valve. A valve spring is positioned on the discharge valve. This valve spring limits an opening degree of the discharge valve by its elastic force. This causes a pressure in the compression chamber to be lower than a pressure in the discharge chamber. When this differential pressure exceeds the elastic force of the elastic reed, the discharge valve closes the passage. On the other hand, when the pressure in the compression chamber exceeds the pressure in the discharge chamber, the discharge valve is biased by the elastic reed and opens the passage, so that a working fluid flows from the compression chamber into the discharge chamber.

CITATION LIST

Patent Literature

Patent Literature 1: Patent Publication No. 4071711

SUMMARY OF INVENTION

Technical Problem

However, in the above described sealed compressor disclosed in Patent Literature 1, even when the pressure in the compression chamber becomes lower than the pressure in the discharge chamber, the discharge valve cannot close the passage, unless the differential pressure between the compression chamber and the discharge chamber exceeds the elastic force of the elastic reed. Since closing of the discharge valve occurs at a later timing, the working fluid flows back from the discharge chamber to the compression chamber.

If a tip end of the discharge valve contacts the valve spring in the middle of opening of the discharge valve, the discharge valve is bent in a S-shape, and a stress concentrates on this portion which is bent to a great degree. However, a width of an intermediate portion of the discharge valve is small due to the elastic reed, and is constant. The entire intermediate portion has low bending strength. For this reason, there may be a possibility that the discharge valve is fractured at a position on which the stress concentrates.

Under the circumstance, a problem associated with durability of the discharge valve exists.

The present invention is directed to solving the above described problem, and an object of the present invention is to provide a valve device of a compressor and a sealed compressor including this valve device, which can suppress a reduction of a durability while lessening energy consumption.

Solution to Problem

According to an aspect of the present invention, a valve device of a compressor comprises a plate having a communication hole communicated with a compression chamber within which a piston is reciprocatable; a plate-shaped reed for opening and closing the communication hole; and a stopper which is disposed to cover the reed and defines an opening degree of the reed; wherein the reed includes: an opening/closing section positioned on an opening of the communication hole; a fastened section fastened to the plate; and a joining section for joining the opening/closing section to the fastened section, the joining section having one or two openings, the opening/closing section, the fastened section and the joining section being arranged in a direction in which a symmetric axis extends; wherein in a portion of the joining section which is closer to the opening/closing section, a pair of portions (hereinafter will be referred to as first outer peripheral portions) of an outer periphery of each of one or two openings which are closest to both ends of the joining section are symmetric with respect to the symmetric axis so as to form a substantially-V-shape or substantially-U-shape, in a direction from the opening/closing section toward the fastened section; and in a portion of the joining section which is closer to the fastened section, a pair of portions (hereinafter will be referred to as second outer peripheral portions) of the outer periphery of each of one or two openings which are closest to the both ends of the joining section are symmetric with respect to the symmetric axis so as to form a substantially-V-shape or substantially-U-shape, in a direction from the fastened section toward the opening/closing section.

Advantageous Effects of Invention

The present invention can achieve advantages that it is possible to provide a valve device of a compressor and a sealed compressor including the valve device, which can suppress a reduction of a durability while lessening energy consumption.

The above and further objects and features of the invention will more fully be apparent from the following detailed description with accompanying drawings.

DESCRIPTION OF EMBODIMENTS

Figure 1:
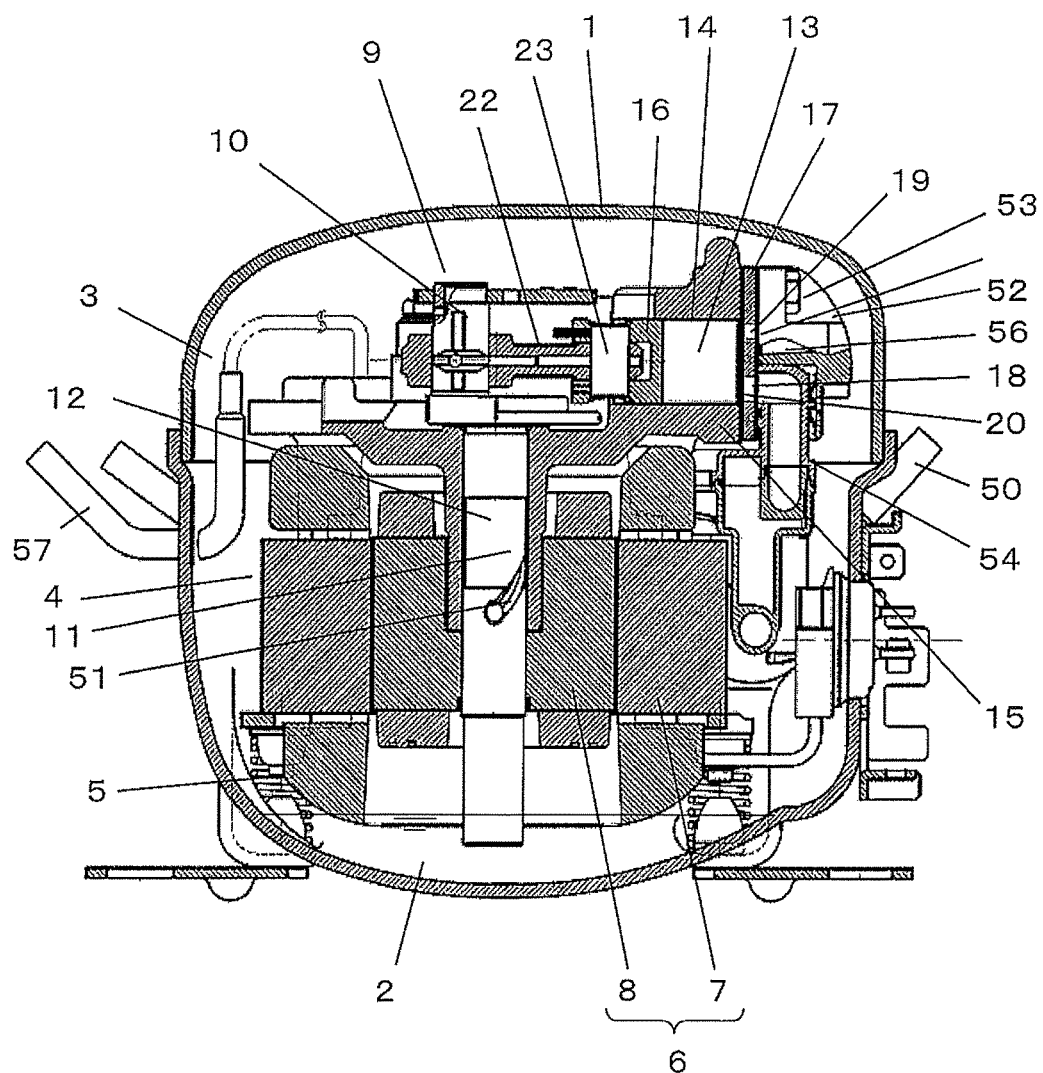
FIG. 1 is a longitudinal sectional view showing a sealed compressor according to Embodiment 1 of the present invention.

A valve device of a compressor according to a first aspect of the present invention comprises a plate having a communication hole communicated with a compression chamber within which a piston is reciprocatable; a plate-shaped reed for opening and closing the communication hole; and a stopper which is disposed to cover the reed and defines an opening degree of the reed; wherein the reed includes: an opening/closing section positioned on an opening of the communication hole; a fastened section fastened to the plate; and a joining section for joining the opening/closing section to the fastened section, the joining section having one or two openings, the opening/closing section, the fastened section and the joining section being arranged in a direction in which a symmetric axis extends; wherein in a portion of the joining section which is closer to the opening/closing section, a pair of portions (hereinafter will be referred to as first outer peripheral portions) of an outer periphery of each of one or two openings which are closest to both ends of the joining section are symmetric with respect to the symmetric axis so as to form a substantially-V-shape or substantially-U-shape, in a direction from the opening/closing section toward the fastened section; and in a portion of the joining section which is closer to the fastened section, a pair of portions (hereinafter will be referred to as second outer peripheral portions) of the outer periphery of each of one or two openings which are closest to the both ends of the joining section are symmetric with respect to the symmetric axis so as to form a substantially-V-shape or substantially-U-shape, in a direction from the fastened section toward the opening/closing section.

In accordance with this configuration, since the opening is formed in the joining section between the opening/closing section of the reed and the fastened section of the reed, a spring constant of the reed is decreased, and a load for deforming the reed is reduced. Since the opening is formed in the reed, a suction force of lubricating oil staying between the reed and the plate, and a suction force of the lubricating oil staying between the reed and the stopper or the like are reduced. Because of this, a load required for the reed to move away from the plate and the stopper or the like is reduced. As a result of these, a load required for the reed to open and close the communication hole is reduced, and hence energy consumed to open and close the communication hole is reduced.

A greatest opening degree of the reed is directly or indirectly defined by the stopper, and the reed is deformed, for example, in a S-shape. For this reason, a bending angle of the portion of the joining section which is closer to the opening/closing section and a bending angle of the portion of the joining section which is closer to the fastened section are increased. However, opening ends corresponding to these portions are narrow, and therefore, bending angles of the reed corresponding to these portions are reduced. Also, a center portion of the opening is wide. Therefore, a spring constant of the reed corresponding to the center portion is small, and the reed corresponding to the center portion is easily bent. As a result, the reed is bent gently as a whole, and concentration of a bending stress is mitigated. Further, a width of the reed is great at the opening ends, and therefore, a reduction of bending strength is suppressed. Therefore, the reed is not bent and fractured, and a reduction of a durability of the reed is suppressed.

According to a second aspect of the present invention, in the valve device of the compressor of the first aspect, the pair of first outer peripheral portions and the pair of second outer peripheral portions may be portions of the outer periphery of one opening extending to cross the symmetric axis, or may be respectively portions of outer peripheries of two openings extending to cross the symmetric axis.

In accordance with this configuration, since the opening extends over the symmetric axis, the pair of first outer peripheral portions and/or the pair of second outer peripheral portions are respectively formed by portions of one opening.

According to a third aspect of the present invention, in the valve device of the compressor of the second aspect, the opening may be a wide hole in which the outer periphery of the opening includes the pair of first outer peripheral portions and portions extending toward the pair of first outer peripheral portions such that the portions are symmetric with respect to the symmetric axis so as to form a substantially-V-shape or substantially-U-shape, the outer periphery of the opening may include the pair of second outer peripheral portions and portions extending toward the pair of second outer peripheral portions such that the portions are symmetric with respect to the symmetric axis so as to form a substantially-V-shape or substantially-U-shape, or the outer periphery of the opening may include the pair of first outer peripheral portions and the pair of second outer peripheral portions.

In accordance with this configuration, the pair of first outer peripheral portions and the pair of second outer peripheral portions are formed by portions of the wide hole.

According to a four aspect of the present invention, in the valve device of the compressor of the second aspect, the opening may be a narrow hole in which the outer periphery of the opening includes the pair of first outer peripheral portions and a portion extending in parallel with the pair of first outer peripheral portions, and/or the pair of second outer peripheral portions and a portion extending in parallel with the pair of second outer peripheral portions.

In accordance with this configuration, the pair of first outer peripheral portions and the pair of second outer peripheral portions are formed by portions of the narrow hole.

According to a fifth aspect of the present invention, in the valve device of the compressor of the fourth aspect, the narrow hole may have a shape in which a portion which is closer to the opening/closing section extends to cross the symmetric axis, and a tongue-shaped section surrounded by the narrow hole may be bent toward the plate.

In accordance with this configuration, since the tongue-shaped section biases the reed so that the reed opens, the reed opens the communication hole with a small load. As a result, consumed energy is lessened.

According to a sixth aspect of the present invention, in the valve device of the compressor of according to any one of the first to fifth aspect, a length of one or two openings in a direction parallel to the symmetric axis may be smaller than a length of the opening/closing section in a direction perpendicular to the symmetric axis.

In accordance with this configuration, since the length of the opening of the reed is smaller than the length of the opening/closing section, the opening/closing section is not inserted into the opening of the reed. Therefore, even when in a tumbling step or the like, many reeds are rolled, it becomes possible to avoid a situation in which the reeds get tangled. In this way, a problem in manufacturing process steps can be mitigated, and a productivity can be improved.

According to a seventh aspect of the present invention, the valve device of the compressor of one of the first to sixth aspects may further comprise a plate-shaped spring reed disposed between the reed and the stopper; wherein one end portion of the spring reed may be fastened to the plate, and the other end portion of the spring reed is positioned in a region in which the opening/closing section of the reed is movable, and the stopper may indirectly limit an opening degree of the reed via the spring reed.

In accordance with this configuration, since the spring reed elastically fastens the reed, it limits a displacement of the reed when the opening/closing section of the reed opens the communication hole. Therefore, a deformation amount of the reed is reduced, and a durability of the reed is improved.

When the reed and the spring reed contact each other during opening of communication hole, these are deformed together with a combined spring constant of the reed and the spring reed. Because of this, a reactive load in a direction in which the reed closes the communication hole becomes greater than that in a case where the reed is provided singly. As a result, a closing speed of the reed is increased, and it becomes possible to avoid a situation in which the reed closes at a later timing.

According to an eighth aspect of the present invention, a sealed compressor comprise a compression component including the valve device of the compressor as recited in any one of the first to seventh aspects, the piston, and a block provided with the compression chamber; an electric component for actuating the piston; and a sealed container accommodating the electric component and the compression component.

In accordance with this configuration, the same advantages as those of the first to seventh aspects can be achieved.

Hereinafter, embodiments of the present invention will be specifically described with reference to the drawings.

Throughout the drawings, the same or corresponding components are designated by the same reference symbols, and will not be described in repetition.

For easier explanation, a direction conforming to an axis of a main shaft actuated by an electric component will be referred to as a longitudinal direction and a direction perpendicular to the longitudinal direction will be referred to as a lateral direction. It should be noted that a reciprocating compressor may be designed so that a piston is reciprocatable in a desired direction.

(Embodiment 1)

[Configuration of Sealed Compressor]

Figure 2A:
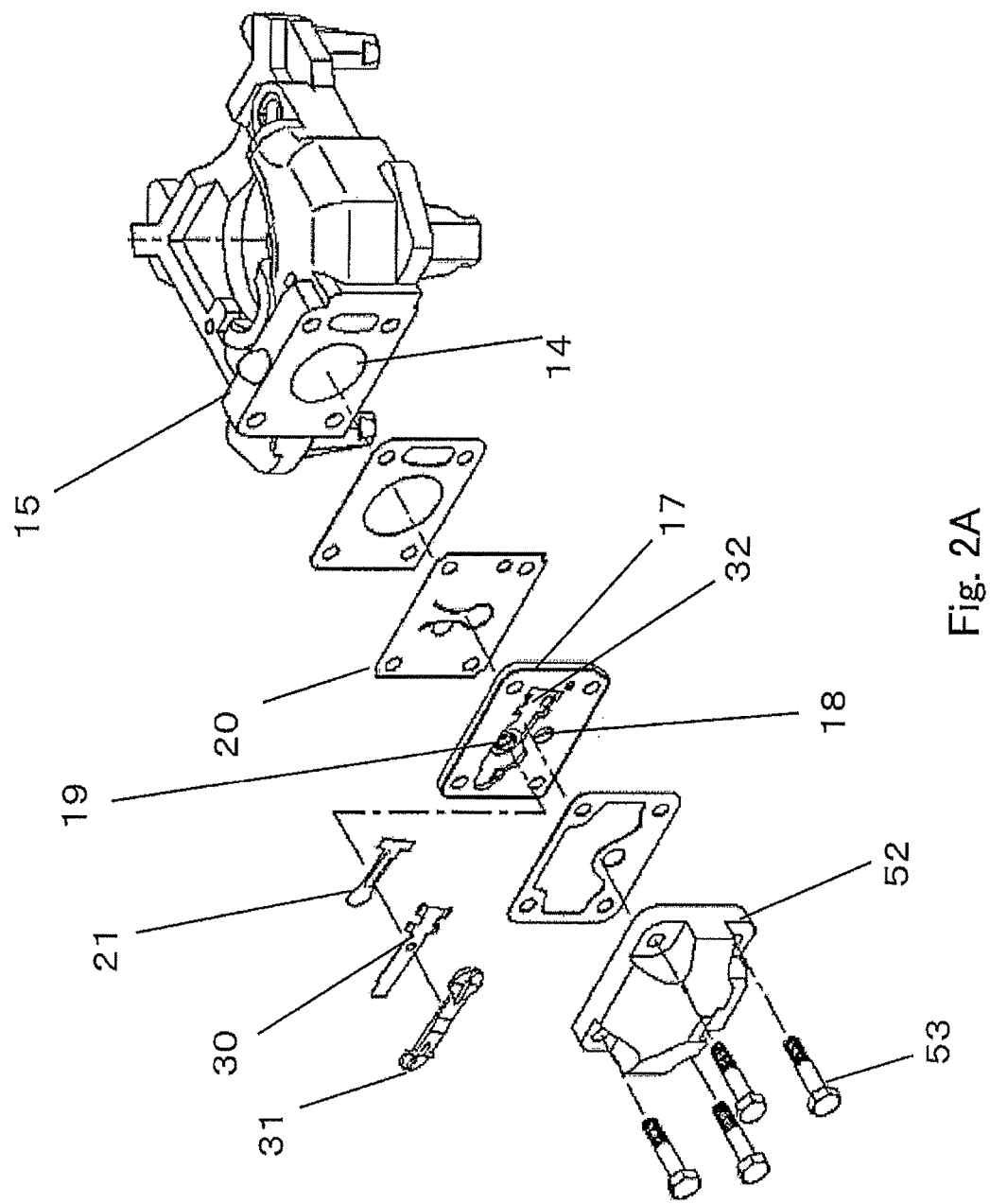
FIG. 2A is an exploded perspective view showing a compression component used in the sealed compressor of FIG. 1.

FIG. 1 is a longitudinal sectional view showing a sealed compressor according to Embodiment 1. FIG. 2A is an exploded perspective view showing constituents between a cylinder block 15 and a cylinder head 52 used in the sealed compressor of FIG. 1.

The sealed compressor includes a valve device as will be described later, an electric component 6, a compression component 9, and a sealed container 1 accommodating the valve device, the electric component 6, and the compression component 9. In the sealed compressor, the compression component 9 actuated by the electric component 6 discharges a working fluid 3. As the sealed compressor of the present embodiment, a well-known sealed compressor including these components may be used. The configuration described below is merely exemplary.

The sealed container 1 stores in a bottom portion thereof, lubricating oil 2 used to lubricate the electric component 6. The sealed container 1 is filled with the working fluid 3 in an interior thereof. As the working fluid 3, for example, hydrocarbon-based R600a, or the like, which is low in global warming potential, is used. A suction pipe 50 used to suction the working fluid 3 and a discharge pipe 57 used to discharge the working fluid 3 are connected to the sealed container 1.

The suction pipe 50 introduces to an interior space of the sealed container 1, the working fluid 3 suctioned into the compression component 9 and compressed therein. One end of the suction pipe 50 is communicated with an interior of the sealed container 1, while the other end thereof is connected to a lower-pressure side of, for example, refrigeration unit (not shown).

The discharge pipe 57 discharges the working fluid 3 compressed by the compression component 9, from the compression component 9 to outside of the sealed container 1. One end of the discharge pipe 57 penetrates the sealed container 1 and is communicated with a discharge muffler (not shown), while the other end thereof is connected to, for example, a higher-pressure side of a refrigeration cycle.

A compression body 4 includes the compression component 9 and the electric component 6 for actuating the compression component 9. The compression body 4 is accommodated into the sealed container 1 and is elastically supported on the sealed container 1 by, for example, a suspension spring 5.

The electric component 6 includes a stator 7 and a rotor 8. The stator 7 is fastened to a lower side of the cylinder block 15. The rotor 8 is coaxially placed at an inner side of the stator 7 and fastened to a main shaft 11.

The compression component 9 includes a crankshaft 12, the cylinder block 15, a piston 16, and a connecting rod 22.

The cylinder block 15 includes a cylinder 14 and a bearing unit 23. The cylinder 14 and the bearing unit 23 are placed such that their axes cross to be substantially orthogonal to each other. The bearing unit 23 rotatably supports the main shaft 11.

A valve plate 17, a suction reed 20 and the cylinder head 52 are fastened to an end surface of the cylinder 14 by means of, for example, a head bolt 53. A gasket, the suction reed 20, the valve plate 17 and a gasket are stacked in this order, between the cylinder block 15 and the cylinder head 52 and fastened to the end surface of the cylinder block 15 by means of the head bolt 53. This seals an opening end of the end surface of the cylinder 14. The valve plate 17 and the cylinder head 52 define a head space 56. The valve plate 17 has a suction hole 18 and a discharge hole 19. The suction hole 18 is opened and closed by the suction reed 20. The discharge hole 19 is opened and closed by the discharge reed 21 of the valve device. A suction muffler 54 is fastened to an end surface of the cylinder 14 by the valve plate 17 and the cylinder head 52. The suction muffler 54 guides the working fluid 3 to an interior of a compression chamber 13 via the suction hole 18.

The compression chamber 13 is formed in an interior of the cylinder 14.

The piston 16 is reciprocatingly inserted into the compression chamber 13. The piston 16 is connected to the connecting rod 22 via the piston pin.

The connecting rod 22 converts a turning motion of an eccentric shaft into a reciprocating motion and transmits this reciprocating motion to the piston 16. The connecting rod 22 has a larger-end portion and a smaller-end portion. The larger-end portion is rotatably fitted to the eccentric shaft. The smaller-end portion is rotatably coupled to the piston 16 via the piston pin.

The crankshaft 12 includes the main shaft 11 rotated by the electric component 6 and the eccentric shaft which is eccentric with respect to the main shaft 11. A pump unit (not shown) is provided at a lower portion of the main shaft 11. A lower portion of the main shaft 11 and the pump unit are immersed in lubricating oil 2. The main shaft 11 is provided with an oil feeding mechanism 51. The oil feeding mechanism 51 feeds the lubricating oil 2 stored in the bottom portion of the sealed container 1 to sliding portions of the compression component 9. The oil feeding mechanism 51 has, for example, a penetrating passage (not shown) penetrating an interior of the main shaft 11, and a spiral groove formed on an outer peripheral surface of the main shaft 11.

[Configuration of Valve Device]

Figure 2B:
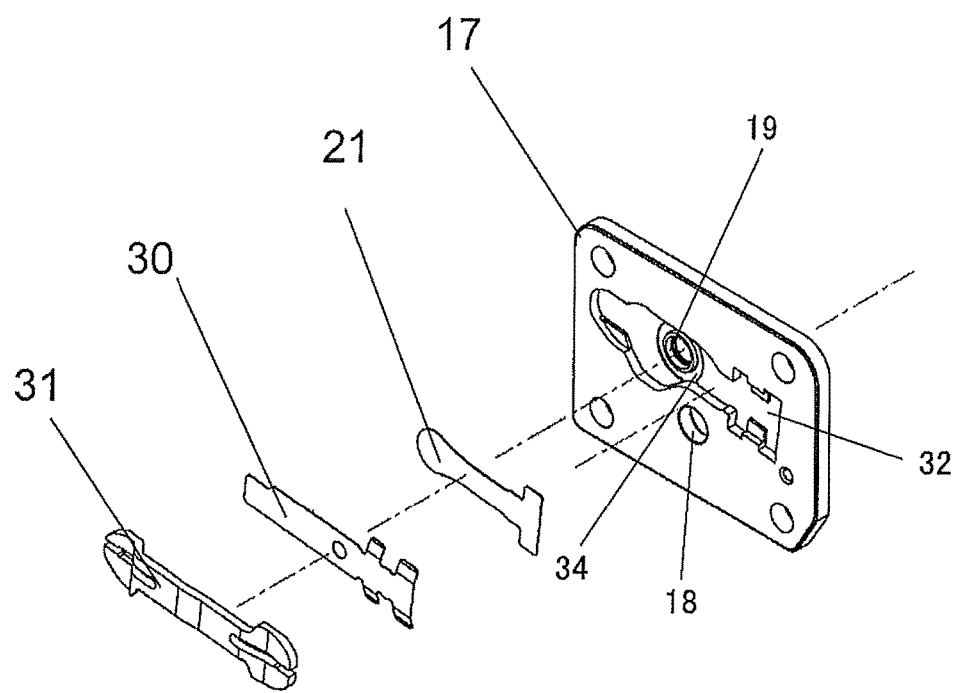
FIG. 2B is an exploded perspective view showing a valve device included in the compression component of FIG. 2A.
Figure 3:
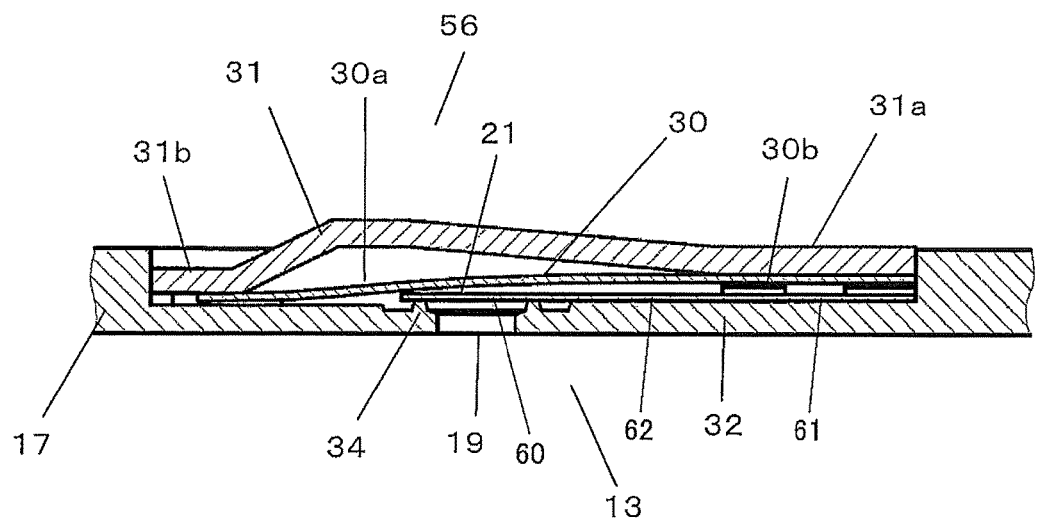
FIG. 3 is a sectional view showing the valve device of FIG. 2B.
Figure 4:
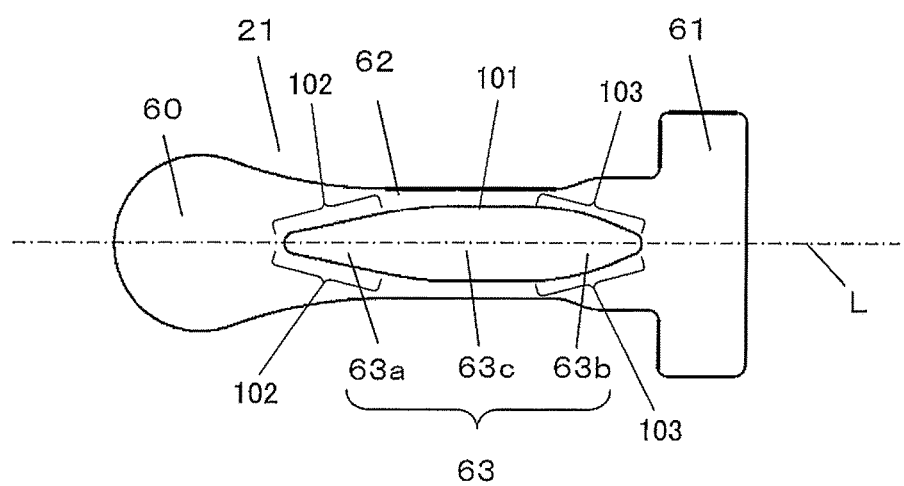
FIG. 4 is a plan view showing a configuration of a discharge reed for use in the valve device of FIG. 3.

FIG. 2B is an exploded perspective view showing a configuration of the valve device for use in the sealed compressor. FIG. 3 is a longitudinal sectional view showing the valve device. FIG. 4 is a plan view showing a discharge reed 21 for use in the valve device. As defined herein, "vertical direction" is a direction perpendicular to an opening plane of the discharge hole 19, while "lateral direction" is a direction perpendicular to the vertical direction.

The valve device is configured such that the discharge reed (reed) 21 opens and closes the opening of the discharge hole (communication hole) extending from the compression chamber 13 to a head space (valve chamber) 56. The valve device includes a valve plate (plate) 17, the discharge reed 21 and a valve stop (stopper) 31. Although in the present embodiment, the valve device further comprises a spring reed 30, the spring reed 30 may be omitted as will be described later.

The valve plate 17 is a plate-shaped member which is provided between the compression chamber 13 and the head space 56 and retains the discharge reed 21. The valve plate 17 is provided with the suction hole 18, the discharge hole 19 (communication hole) and a recess. The suction hole 18 and the discharge hole 19 communicate the compression chamber 13 in which the piston 16 reciprocates, and the head space 56. The valve plate 17 is provided with the recess on a surface facing the head space 56. The discharge reed 21, the spring reed 30 and the valve stop 31 are accommodated into the recess. In a bottom portion of the recess, a seat 32 and a seat surface 34 are provided. The seat 32 is a seat on which a fastened section 61 of the discharge reed 21 is placed and surrounds the discharge hole 19. The seat surface 34 is formed by a tip end surface of a tubular seat such that the tubular seat protrudes in a peripheral portion of the discharge hole 19. An opening/closing section 60 of the discharge reed 21 contacts and moves away from the seat surface 34.

The discharge reed 21 is a member for opening and closing the discharge hole 19. The discharge reed 21 has a flat plate shape and is formed by, for example, a spring steel having an elastic force. The discharge reed 21 includes the opening/closing section 60, the fastened section 61 and a joining section 62. The discharge reed 21 is configured such that the opening/closing section 60, the fastened section 61 and the joining section 62 are placed in a direction in which a symmetric axis L extends. It should be noted that the discharge reed 21 is preferably symmetric with respect to the symmetric axis L to suppress a twist operation in a width direction (direction perpendicular to the symmetric axis L). Although in the example of FIG. 4, the entire discharge reed 21 is symmetric with respect to the symmetric axis L, the fastened section 63 may not be symmetric with respect to the symmetric axis L. Although the opening/closing section 60 is preferably symmetric with respect to the symmetric axis L from the above stated view point, it may not be symmetric with respect to the symmetric axis L. The joining section 62 is preferably symmetric with respect to the symmetric axis L, to a greatest possible degree.

The opening/closing section 60 is a tip end portion of the discharge reed 21 and opens and closes the discharge hole 19. The opening/closing section 60 is positioned on the discharge hole 19 such that it is vertically movable. The opening/closing section 60 is greater in size than the discharge hole 19 and is able to fully close the discharge hole 19. The opening/closing section 60 may have a desired shape, and has a substantially disc shape in the present embodiment.

The fastened section 61 is a base end portion of the discharge reed 21 and is fastened to the seat 32 of the valve plate 17. The fastened section 61 is fastened by, for example, the valve stop 31, but may be fastened by another method. The fastened section 61 has a desired shape. In the present embodiment, the fastened section 61 has a substantially rectangular shape.

The joining section 62 joins the opening/closing section 60 to the fastened section 61. The joining section 62 is preferably symmetric with respect to the symmetric axis L, but its shape is not particularly limited. In the present embodiment, the joining section 62 has a substantially rectangular shape, and extends in parallel with the symmetric axis L. The joining section 62 has an opening 63.

The opening 63 extends to cross the symmetric axis L. An outer periphery 101 of the opening 63 is symmetric with respect to the symmetric axis L. In a portion of the joining section 62 which is closer to the opening/closing section 60, a pair of portions (hereinafter will be referred to as first outer peripheral portions) 102 of the outer periphery 101 of the opening 63 which are closest to both ends of the joining section 62 (herein, this limitation is unnecessary) are symmetric with respect to the symmetric axis L so as to form a substantially-V-shape or substantially-U-shape, in a direction from the opening/closing section 60 toward the fastened section 61. In other words, the pair of first outer peripheral portions 102 are symmetric with respect to the symmetric axis L so as to form a substantially-V-shape or substantially-U-shape such that a distance between the first outer peripheral portions 102 in a direction perpendicular to the symmetric axis L gradually increases (the first outer peripheral portions 102 are gradually spaced apart from each other).

Also, in a portion of the joining section 62 which is closer to the fastened section 61, a pair of portions (hereinafter will be referred to as second outer peripheral portions) 103 of the outer periphery 101 of the opening 63 which are closest to the both ends of the joining section 62 (herein, this limitation is unnecessary) are symmetric with respect to the symmetric axis L so as to form a substantially-V-shape or substantially-U-shape such that a distance between the second outer peripheral portions 103 in the direction perpendicular to the symmetric axis L gradually increases (the second outer peripheral portions 103 are gradually spaced apart from each other) in a direction from the fastened section 61 toward the opening/closing section 60. In brief, the outer periphery 101 of the opening 63 includes the pair of first outer peripheral portions 102 and the pair of second outer peripheral portions 103. The pair of first outer peripheral portions 102 and the pair of second outer peripheral portions 103 are portions of the outer periphery of one opening extending to cross the symmetric axis. In the present invention, this opening will be referred to as a "wide hole" to be distinguished from a slit as will be described later. Thus, a width of the opening 63 in the direction perpendicular to the symmetric axis L is smaller toward both ends thereof and is greater toward a center thereof. A length of the opening 63 in the direction of the symmetric axis L is greater than the width of the opening/closing section 60, in the direction perpendicular to the symmetric axis L.

Specifically, the opening 63 includes an opening/closing section side portion (potion at opening/closing section side) 63a, a fastened section side portion (portion at fastened section side) 63b and an intermediate portion 63c. The opening/closing section side portion 63a gradually increases in dimension in the direction perpendicular to the symmetric axis L, in the direction from the opening/closing section 60 toward the fastened section 61, and is symmetric with respect to the symmetric axis L. The opening/closing section side portion 63a has a shape of a substantially isosceles triangle which is symmetric with respect to the symmetric axis L. The outer periphery 101 of the opening 63, corresponding to the opening/closing section side portion 63a, has a V-shape or U-shape symmetric with respect to the symmetric axis L, in which portions of the outer periphery 101 are gradually spaced apart from each other in the direction perpendicular to the symmetric axis L, toward the intermediate portion 63c. The fastened section side portion 63b gradually increases in dimension in the direction perpendicular to the symmetric axis L, in the direction from the fastened section 61 toward the opening/closing section 60, and is symmetric with respect to the symmetric axis L. The fastened section side portion 63b has a shape of a substantially isosceles triangle which is symmetric with respect to the symmetric axis L. The outer periphery 101 of the opening 63, corresponding to the fastened section side portion 63b, has a V-shape or U-shape symmetric with respect to the symmetric axis L, in which portions of the outer periphery 101 are gradually spaced apart from each other in the direction perpendicular to the symmetric axis L, toward the intermediate portion 63c. The intermediate portion 63c joins the opening/closing section side portion 63a and the fastened section side portion 63b to each other. The outer periphery 101 of the opening 63, corresponding to the intermediate portion 63c, extends in parallel with respect to the symmetric axis L.

In the above structure, a width of the intermediate portion 63c in the direction perpendicular to the symmetric axis L is greatest, a width of the opening/closing section side portion 63a decreases toward the opening/closing section 60, and a width of the fastened section side portion 63b decreases toward the fastened section 61. In this structure, the discharge reed 21 has a width greater in the portion corresponding to the opening/closing section side portion 63a and the fastened section side portion 63b than the portion corresponding to the intermediate portion 63c. Therefore, in this portion having a greater width, a spring constant and bending strength are greater.

The spring reed 30 is a member for biasing the discharge reed 21 so that the discharge reed 21 is closed. The spring reed 30 has a flat plate shape and is formed by, for example, a spring steel having an elastic force. The spring reed 30 is placed between the discharge reed 21 and the valve stop 31. The spring reed 30 includes a fastened section 30b provided at one end thereof and a movable section 30a provided at the other end thereof. The movable section 30a is placed in a range within which the opening/closing section 60 of the discharge reed 21 is movable, above the opening/closing section 60. The fastened section 30b is fastened to the seat 32 of the valve plate 17. In the present embodiment, the fastened section 30b is fastened together with the fastened section 61 by the valve stop 31. An end portion of the fastened section 30b is bent toward the discharge reed 21, and therefore there is a clearance between the end portion of the fastened section 30b and the fastened section 61. This causes the movable section 30a to be pushed toward the valve plate 17. The movable section 30a is movable while elastically pushing the opening/closing section 60 of the discharge plate 21 and biases the opening/closing section 60 so that the opening/closing section 60 is closed. A tip end portion of the movable section 30a is sandwiched between the valve stop 31 and the valve plate 17 and its vertical movement is limited. It should be noted that a spacing between the valve stop 31 and the valve plate 17 is a little greater than a thickness of the spring reed 30, and therefore the tip end portion of the movable section 30a is movable laterally between them.

The valve stop 31 is a stopper disposed to cover the discharge reed 21, to indirectly limit a greatest opening degree of the discharge reed 21. The valve stop 31 serves to limit a vertical movement (displacement) of the discharge reed 21 and a vertical movement of the spring reed 30. The valve stop 31 includes a fastening section 31a provided at one end thereof and a limiting section 31b provided at the other end thereof. Each of the fastening section 31a and the limiting section 31b has a hollow portion formed by cutting and extending in a lengthwise direction thereof. A width of the fastening section 31a and a width of the limiting section 31b are a little greater than a width of a recess of the valve plate 17. The valve stop 31 is fastened to the valve plate 17 in such a way that the valve stop 31 is pushed into the recess of the valve plate 17 such that the width of the hollow portion is elastically reduced, and the fastening section 31a and the limiting section 31b elastically react such that the width of the hollow portion is increased. The fastening section 31a fastens the fastened section 61 of the discharge reed 21 and the fastened section 30b of the spring reed 30 to the seat 32 of the valve plate 17. The tip end portion of the limiting section 31b vertically fastens the movable section 30a such that the tip end portion of the movable section 30a is laterally movable. The limiting section 31b is bent to form a gap between the limiting section 31b and the valve plate 17. The movable section 30a of the spring reed 30 and the opening/closing section 60 of the discharge reed 21 are placed in this gap. A height of this gap is smaller than a greatest displacement amount of the opening/closing section 60 and a greatest displacement amount of the movable section 30a. Therefore, the opening/closing section 60 displaced to a greatest degree and the movable section 30a displaced to a greatest degree contact the limiting section 31b and thereby are limited in displacement.

[Operation of Sealed Compressor]

Hereinafter, an operation of the sealed compressor configured as described above will be described. The operation of the sealed compressor is well-known, and therefore will be described in brief.

In the sealed compressor, when the stator 7 is applied with an electric current, the rotor 8 causes the main shaft 11 to rotate. This rotation is transmitted to the piston 16 via the crankshaft 12, the eccentric shaft 10 and the connecting rod 22, causing the piston 16 to reciprocate within the cylinder 14.

In a suction stroke, the working fluid 3 in the interior of the compression chamber 13 expands. When a pressure in the interior of the compression chamber 13 falls below a suction pressure, the suction reed 20 opens because of a difference between the pressure in the interior of the compression chamber 13 and the pressure in the interior of the suction muffler 54. The working fluid 3 flows from the refrigeration unit (not shown) into the sealed container 1 via the suction pipe 50, and into the interior of the compression chamber 13 via the suction muffler 54.

In a discharge stroke, when the pressure in the interior of the compression chamber 13 increases, and the suction reed 20 closes because of a difference between the pressure in the interior of the compression chamber 13 and the pressure in the interior of the suction muffler 54. Then, the working fluid 3 is compressed and the pressure in the compression chamber 13 increases. When the pressure in the interior of the compression chamber 13 exceeds a pressure in the interior of the head space 56, the discharge reed 21 opens. Thus, the working fluid 3 which has been compressed and increased in its temperature flows through the discharge hole 19 of the valve plate 17, the head space 56 and a discharge muffler (not shown), and is discharged to a higher-pressure side (not shown) of the refrigeration cycle through the discharge pipe 57.

The working fluid 3 is discharged from the compression chamber 13, and the pressure in the interior of the compression chamber 13 decreases, so that the difference between the pressure in the interior of the compression chamber 13 and the pressure in the interior of the head space 56 is lessened. When a force applied to the discharge reed 21 due to the pressure difference becomes smaller than a restoring force of the spring reed 30 and a restoring force of the discharge reed 21, the discharge reed 21 closes. In this way, the compression chamber 13 is closed. The above stated strokes are repeated.

[Operation of Valve Device]

Hereinafter, an operation of the valve device will be described.

Figure 5A:
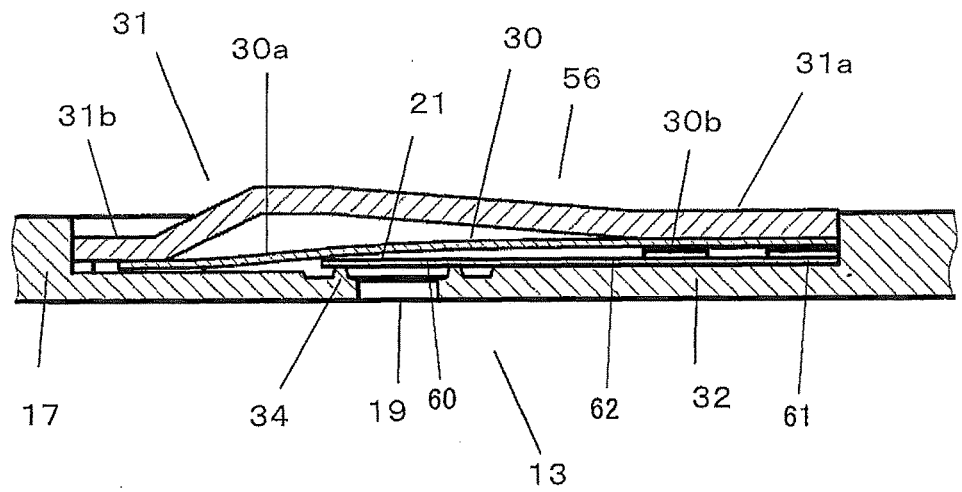
FIG. 5A is a cross-sectional view showing a state in which the discharge reed of FIG. 3 closes a discharge hole.
Figure 5B:
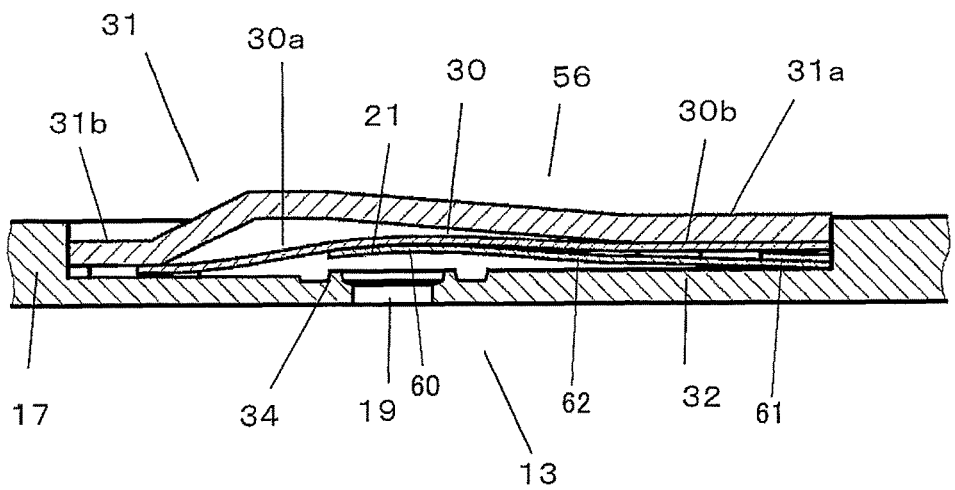
FIG. 5B is a cross-sectional view showing a state in which the discharge reed of FIG. 5A opens the discharge hole.
Figure 5C:
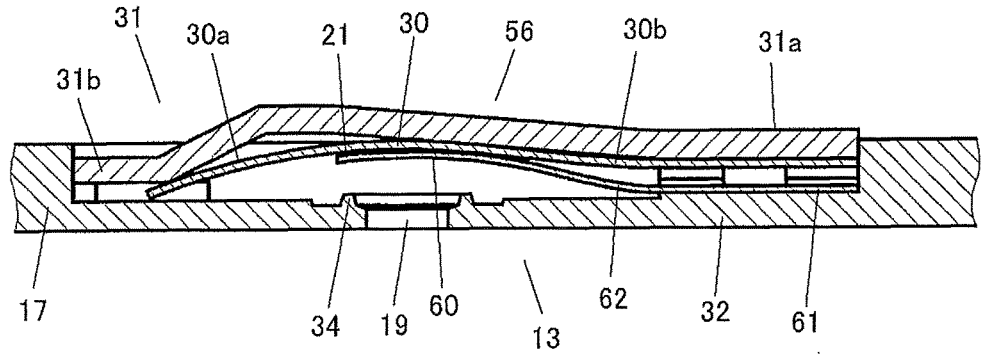
FIG. 5C is a cross-sectional view showing a state in which the discharge reed of FIG. 5B is displaced to a greatest degree.

FIG. 5A is a cross-sectional view showing a state in which the discharge reed 21 closes the discharge hole 19. FIG. 5B is a cross-sectional view showing a state in which the discharge reed 21 opens the discharge hole 19. FIG. 5C is a cross-sectional view showing a state in which the opening/closing section 60 of discharge reed 21 is displaced to a greatest degree.

As shown in FIG. 5A, in the state in which the opening/closing section 60 closes the discharge hole 19, the opening/closing section 60 is in contact with the seat surface 34 of the valve plate 17 via the lubricating oil 2 and the joining section 62 is in contact with the seat 32 of the valve plate 17 via the lubricating oil 2. Because of a surface tension of the lubricating oil 2, the opening/closing section 60 and the joining section 62 of the discharge reed 21 are suctioned onto the seat surface 34 of the valve plate 17 and the seat 32 of the valve plate 17, respectively. When a force for pushing up the opening/closing section 60 due to the difference between the pressure in the interior of the compression chamber 13 and the pressure in the interior of the head space 56 exceeds this suction force and a force for elastically deforming the joining section 62 of the discharge reed 21, the opening/closing section 60 is displaced upward and opens the discharge hole 19, as shown in FIG. 5B.

When the joining section 62 is deformed, the discharge reed 21 pushes up the movable section 30a of the spring reed 30. At this time, the tip end portion of the movable section 30a moves out of the gap and the movable section 30a moves upward. Since the vertical movement of the spring is limited by the tip end portion of the movable section 30a and the fastened section 61, the movable section 30a is curved in an arched shape. The opening/closing section 60 and the joining section 62 of the discharge reed 21 are curved to conform in shape to the movable section 30a.

When the pressure in the interior of the compression chamber 13 further increases, the discharge reed 21 is pushed up. As shown in FIG. 5C, the discharge reed 21 is deformed to a great degree. According to this, the movable section 30a is deformed and contacts the limiting section 31b. At this time, within a projecting range of the discharge hole 19, the opening/closing section 60 contacts the intermediate portion of the valve stop 31 via the movable section 30a. Because of this, the discharge reed 21 is displaced to a greatest degree and deformed in a S-shape.

When the pressure in the interior of the compression chamber 13 decreases, and the force for pushing up the discharge reed 21 due to the difference between the pressure in the interior of the compression chamber 13 and the pressure in the interior of the head space 56, becomes smaller than the force for pushing down the discharge reed 21 due to the restoring force of the spring reed 30 and the restoring force of the joining section 62, the discharge reed 21 and the spring reed 30 are displaced downward. Further, the difference between the pressure in the interior of the compression chamber 13 and the pressure in the interior of the head space 56 decreases, and the restoring force of the discharge reed 21 and the restoring force of the spring reed 30 exceed the difference between the pressure in the interior of the compression chamber 13 and the pressure in the interior of the head space 56, and the suction force of the lubricating oil 2 staying between the opening/closing section 60 and the movable section 30a. As a result, as shown in FIG. 5A, the opening/closing section 60 moves away from the movable section 30a and closes the discharge hole 19.

[Advantages]

Hereinafter, a load applied to the discharge reed 21 of Embodiment 1 will be described.

Figure 6A:
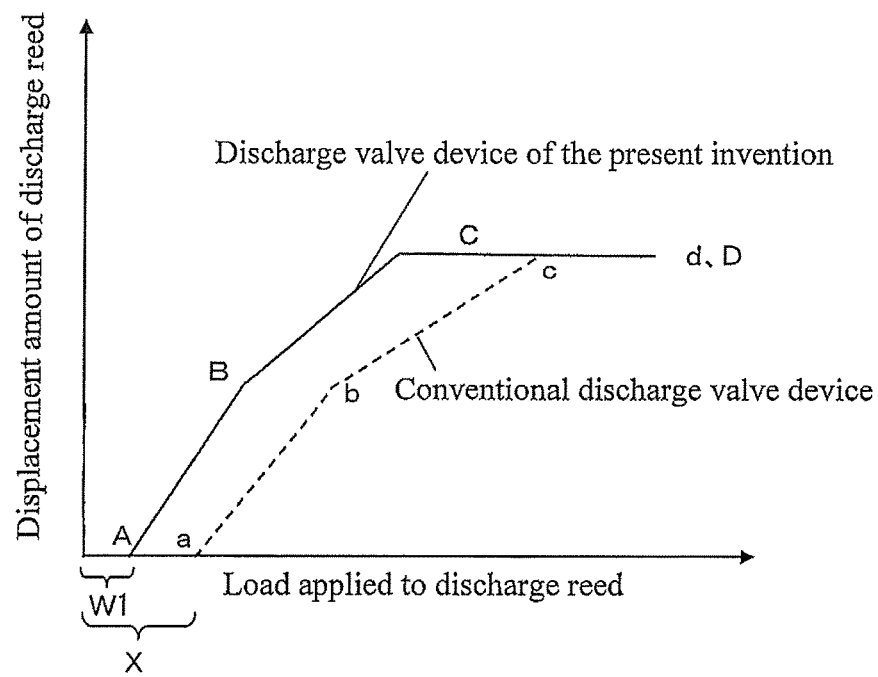
FIG. 6A is a graph showing a relationship between a load applied to the discharge reed and a displacement amount of the discharge reed, when the discharge reed opens the discharge hole in the example shown in FIGS. 5A to 5C.
Figure 6B:
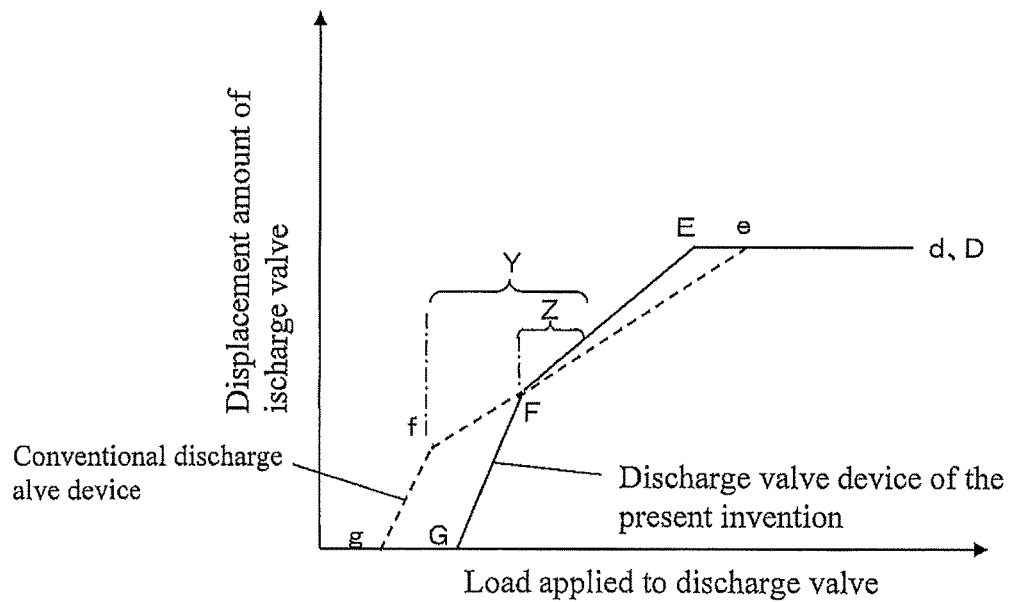
FIG. 6B is a graph showing a relationship between a load applied to the discharge reed and a displacement amount of the discharge reed, when the discharge reed closes the discharge hole in the example shown in FIGS. 5A to 5C.

FIG. 6A is a graph schematically showing a relationship between a displacement amount of the discharge reed 21 and a load applied to the discharge reed 21 when the discharge reed 21 opens. FIG. 6B is a graph schematically showing a relationship between a displacement amount of the discharge reed 21 and a load applied to the discharge reed 21 when the discharge reed 21 closes. In FIGS. 6A and 6B, a vertical axis indicates the displacement amount of the discharge reed 21 and a horizontal axis indicates the load applied to the discharge reed 21. A solid line indicates the relationship of the discharge reed 21 having the opening 63 of Embodiment 1, while a broken line indicates the relationship of a conventional discharge reed which does not have the opening 63.

In the case where the discharge reed 21 opens, the discharge reed 21 of Embodiment 1 is displaced in the order of A, B, C, and D as the load increases, as shown in FIG. 6A.

At a point A, the load becomes greater than the suction force of the lubricating oil 2 or the like, and the discharge reed 21 moves away from the seat surface 34 of the valve plate 17. Then, from the point A to a point B, only the discharge reed 21 is deformed. Therefore, the discharge reed 21 is displaced to a great degree with a small load. At the point B, the discharge reed 21 contacts the spring reed 30. From the point B to a point C, the discharge reed 21 presses up the spring reed 30 while contacting the spring reed 30. Therefore, the discharge reed 21 and the spring reed 30 are deformed by a combined spring constant of these. This causes a need for a great load for displacing the discharge reed 21. At the point C, the spring reed 30 and the valve stop 31 contact each other, and the discharge reed 21 is displaced to a greatest degree. Even when a load is further applied to the discharge reed 21, the discharge reed 21 is not displaced, because the valve stop 31 limits the discharge reed 21.

The conventional discharge reed opens in the order of a, b, c, and d as the load increases.

Specifically, at a point a, the conventional discharge reed moves away from the seat surface 34 of the valve plate 17. From the point a to the point b, only the discharge reed is deformed. At the point b, the discharge reed contacts the spring reed 30. From the point b to the point c, the discharge reed is deformed together with the spring reed 30. At the point c, the spring reed 30 contacts the valve stop 31 and the discharge reed is displaced to a greatest degree.

A load indicated by W1 is a load required for the discharge reed 21 to cut off the suction force due to the surface tension of the lubricating oil 2 staying between the discharge reed 21 and the seat surface 34 and the seat 32 of the valve plate 17, which is generated when the discharge reed 21 contacts or is close to the seat surface 34 and the seat 32 of the valve plate 17. In the conventional discharge valve device, the load is X. Since the discharge reed 21 has the opening 63, an area of the portion of the discharge reed 21 which contacts or is closer to the seat 32 of the valve plate 17 is smaller than that in the conventional discharge reed. Because of this, the load W1 for cutting off the suction force due to the lubricating oil 2 between the discharge reed 21 and the seat 32 of the valve plate 17 is smaller than the load X for the conventional discharge reed.

In addition, since the discharge reed 21 has the opening 63, the spring constant of the discharge reed 21 is decreased. Therefore, a slope from the point A to the point B is greater than a slope from the point a to the point b. Also, a slope from the point B to the point C is greater than a slope from the point b to the point c. In this way, the discharge reed 21 is displaced with a smaller load than the conventional discharge reed.

As described above, in the discharge valve device of Embodiment 1, since the discharge reed 21 has the opening 63, the suction force of the lubricating oil 2 and the load for displacing the discharge reed 21 are reduced, and hence the load for opening the discharge reed 21 is decreased. Therefore, consumed energy is lessened. In addition, it becomes possible to avoid a situation in which the discharge hole 19 is opened a later timing. This makes it possible to suppress the working fluid 3 from being excessively compressed in the discharge stroke, and a discharge efficiency of a reciprocating compressor is increased.

As shown in FIG. 6B, when the discharge reed 21 closes, the discharge reed 21 of Embodiment 1 closes in the order of D, E, F, and G as the load decreases.

Specifically, at the point D, the discharge reed 21 is displaced to a greatest degree. At the point E, the spring reed 30 moves away from the valve stop 31. From the point E to the point F, the discharge reed 21 and the spring reed 30 are deformed together while contacting each other. At the point F, the discharge reed 21 moves away from the spring reed 30. From the point F to the point G, the discharge reed 21 is deformed singly. At the point G, the discharge reed 21 contacts the seat surface 34 of the valve plate 17 and closes the discharge hole 19.

The conventional discharge valve device goes through a similar course, and the discharge reed closes in the order of d, e, f, and g.

Specifically, at the point d, the conventional discharge reed is in a state in which it is displaced to a greatest degree. At the point e, the spring reed 30 moves away from the valve stop 31. From the point e to the point f, the discharge reed and the spring reed 30 are deformed together while contacting each other. At the point f, the discharge reed moves away from the spring reed 30. From the point f to the point g, the discharge reed is deformed singly. At the point g, the discharge reed contacts the seat surface 34 of the valve plate 17 and closes the discharge hole 19.

A load indicated by Z is a load required for the discharge reed 21 to cut off the suction force due to the surface tension of the lubricating oil 2 staying between the discharge reed 21 and the spring reed 30, which is generated when the discharge reed 21 contacts or is close to the spring reed 30. In the conventional discharge valve device, the load is Y. Since the discharge reed 21 of Embodiment 1 has the opening 63, an area of the portion of the discharge reed 21 which contacts or is closer to the spring reed 30 is smaller than that in the conventional discharge reed. Therefore, Y<Z is satisfied.

Since the discharge reed 21 has the opening 63, the spring constant of the discharge reed 21 is decreased. Therefore, a slope from the point E to the point F is greater than a slope from the point e to the point f. Also, a slope from the point F to the point G is greater than a slope from the point f to the point g. Thus, the discharge reed 21 is deformed with a smaller load than the conventional discharge reed.

As described above, in the discharge valve device of Embodiment 1, the suction force of the lubricating oil 2 and the load for displacing the discharge reed 21 are decreased, and the load required for the discharge reed 21 to close the discharge hole 19 is decreased. Therefore, consumed energy is lessened. In addition, since it becomes possible to avoid a situation in which the discharge hole 19 is closed at a later timing, re-inflow of the working fluid 3 into the compression chamber 13 can be suppressed, and a reduction of a refrigeration capability of the compressor can be mitigated.

Hereinafter, a stress generated in the discharge reed 21 of Embodiment 1 will be described.

Figure 7A:
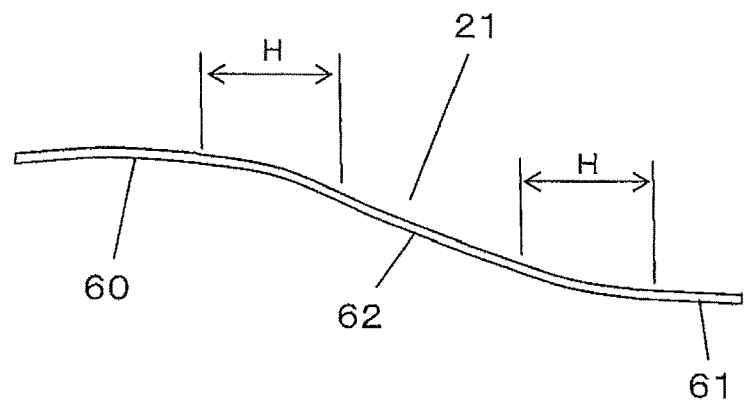
FIG. 7A is a side view schematically showing a stress generated in the discharge reed deformed in the state of FIG. 5C.
Figure 7B:
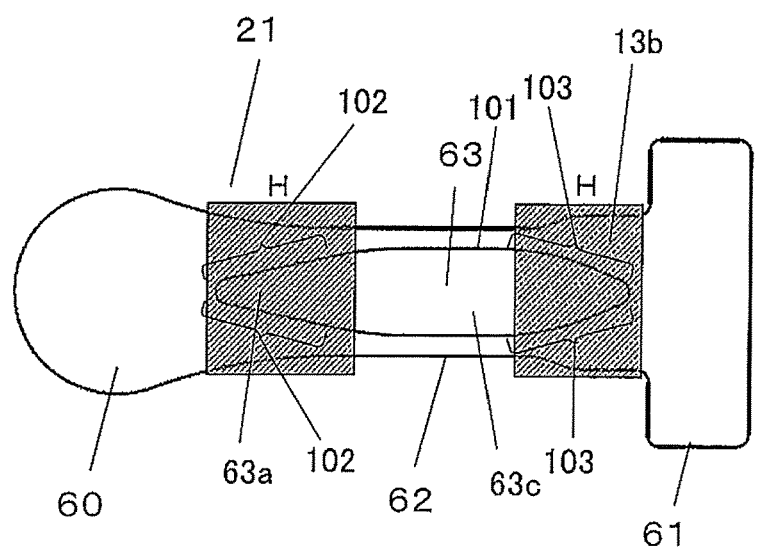
FIG. 7B is a plan view schematically showing the stress generated in the discharge reed of FIG. 7A.

FIG. 7A is a side view showing the deformed discharge reed 21. FIG. 7B is a plan view showing the deformed discharge reed 21.

As shown in FIG. 5C, when the discharge reed 21 is displaced to a greatest degree and deformed in a S-shape, the fastened section 61 is not displaced to a great degree, because the fastened section 61 is elastically fastened by the spring reed fastened section 30b. The opening/closing section 60 of the discharge reed 21 is limited in displacement by the movable section 30a and the limiting section 31b. Because of this, the discharge reed 21 is likely to be bent to a great degree in a range of H of FIG. 7A, i.e., at both ends of the joining section 62. As shown in FIG. 7B, the fastened section side portion 63b and the opening/closing section side portion 63a of the opening 63 are formed in the range of H. The width of the discharge reed 21 in the range where the fastened section side portion 63 and the opening/closing section side portion 63 of the opening 63 are formed is greater than the width of the discharge reed 21 in a range where the intermediate portion 63c of the opening 63 is formed. Because of this, the portion of the discharge reed 21 in the range of H has a great spring constant and is not easily bent. In contrast, the portion of the discharge reed 21 in the range where the intermediate portion 63c is formed has a small spring constant and is easily bent. This allows the discharge reed 21 to be gently bent as a whole, which prevents concentration of a stress. Bending strength of the discharge reed 21 in the range of H is great. Therefore, the discharge reed 21 is not fractured and a reduction of a durability of the discharge reed 21 is prevented.

[Modified Example 1]

Figure 8:
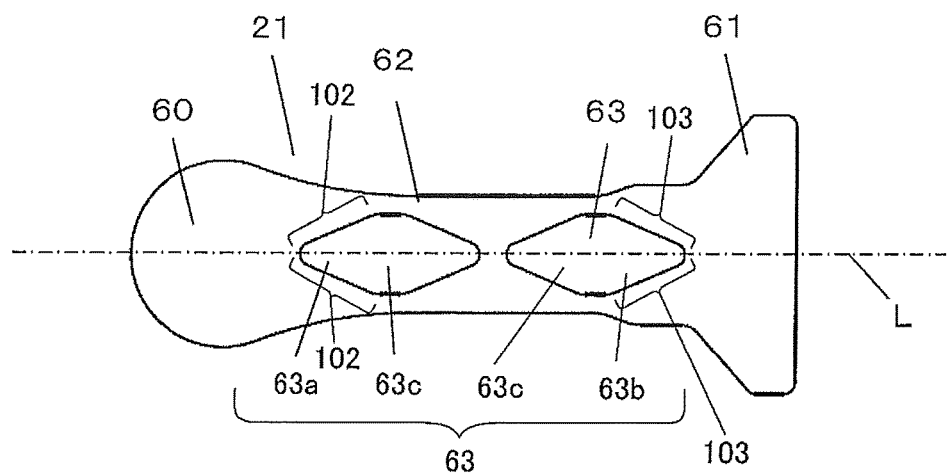
FIG. 8 is a plan view showing a configuration of a discharge reed according to Modified example 1 of Embodiment 1.

Although the discharge reed 21 of FIG. 4 has one opening 63, the number of the opening 63 is not limited to this, but the discharge reed 21 may have a plurality of openings 63 in the direction in which the symmetric axis L extends. In modified example 1, for example, as shown in FIG. 8, two openings 63 are arranged along the direction of the symmetric axis L. The outer periphery of the opening 63 which is closer to the opening/closing section 60 is a wide hole including the pair of first outer peripheral portions 102 and the portion extending toward the pair of first outer peripheral portions 102 such that it is symmetric with respect to the symmetric axis L so as to form a substantially-V-shape or substantially-U-shape. The outer periphery of the opening 63 which is closer to the fastened section 61 is a wide hole including the pair of second outer peripheral portions 103 and the portion extending toward the pair of second outer peripheral portions 103 such that it is symmetric with respect to the symmetric axis L so as to form a substantially-V-shape or substantially-U-shape. Between these two openings 63, there is a blank space. This does not have a special technical significance except that one opening 63 is divided in two. Since these two openings 63 can be assumed as one opening 63, the same advantages as those of the configuration of FIG. 4 can be achieved. The present invention has a technical significance in that one or two opening(s) 63 include(s) the pair of first outer peripheral portions 102 and the pair of second outer peripheral portions 103, and does not have a technical significance regarding an opening which does not include the pair of first outer peripheral portions 102 and the pair of second outer peripheral portions 103. The number of the openings 63 which can include the pair of first outer peripheral portions 102 and the pair of second outer peripheral portions 103 is two at maximum. Therefore, there is no special technical significance in formation of three or more openings.

[Modified Example 2]

Although the opening 63 of the discharge reed 21 of FIG. 4 includes the opening/closing section side portion 63a, the fastened section side portion 63b and the intermediate portion 63c, the shape of the opening 63 is not limited to this. The opening 63 may have a shape in which the portion in the range of the both ends in the direction of the symmetric axis L is narrow and the opening 63 is symmetric with respect to the symmetric axis L. For example, the opening 63 may have a rhombus shape or an oval shape.

[Modified Example 3]

Although the length of the opening 63 of the discharge reed 21 of FIG. 4 in the direction of the symmetric axis L, is greater than the width of the opening/closing section 60 which is in the direction perpendicular to the symmetric axis L, it may be equal to or smaller than the width of the opening/closing section 60 which is in the direction perpendicular to the symmetric axis L. In this case, the same advantages as those of FIG. 4 can be achieved. For example, when the length of the opening 63 in the direction of the symmetric axis L is smaller than the width of the opening/closing section 60 which is in the direction perpendicular to the symmetric axis L, the opening/closing section 60 is not inserted into the opening 63. In a tumbling step for removing a burr generated at a cut surface of the discharge reed 21, etc., many discharge reeds 21 are loaded into a barrel and rolled. In this case, it becomes possible to avoid a situation in which the opening/closing sections 60 are inserted into the openings 63, respectively, and thereby the discharge reeds 21 get tangled and bent. In this way, a problem in manufacturing process steps can be mitigated, and a productivity can be improved.

[Modified Example 4]

Figure 9:
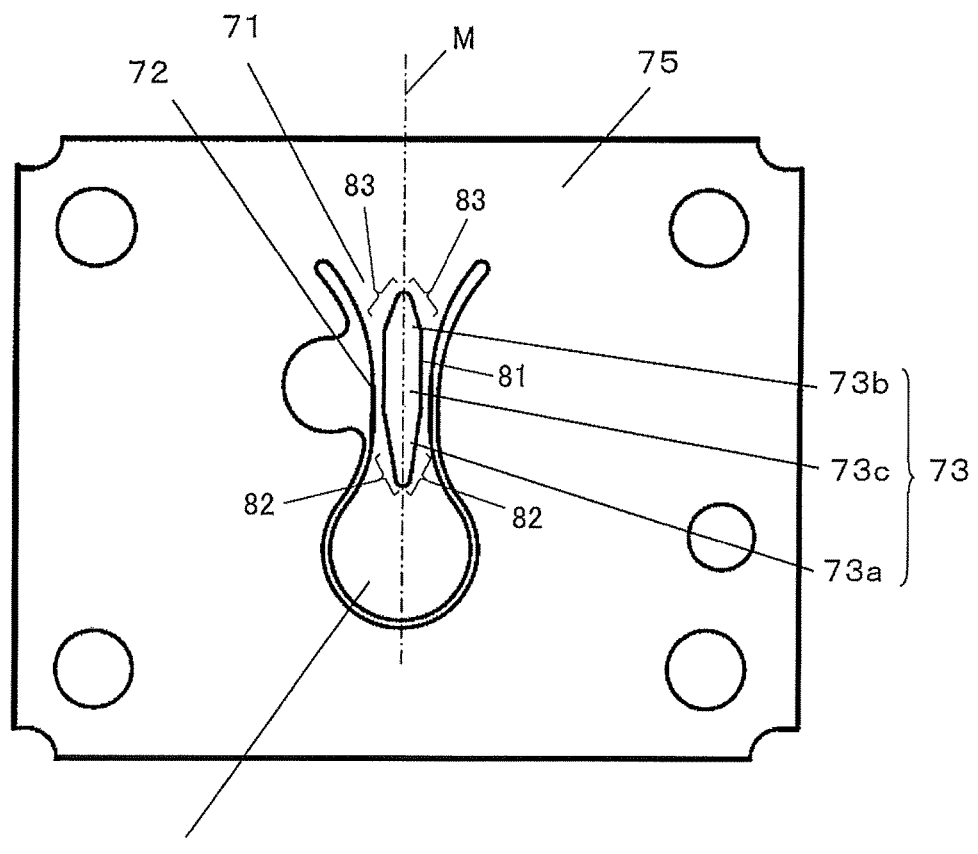
FIG. 9 is a plan view showing a configuration of a suction reed according to Modified example 4 of Embodiment 1.

Although the discharge hole 21 has the opening 63 in the example of FIG. 4, the suction reed 75 may have an opening 73 as shown in FIG. 9.

The suction reed 75 includes an opening/closing section 70, a fastened section 71 and a joining section 72. The opening/closing section 70 opens and closes the suction hole 18 and has a circular shape which is greater in dimension than the suction hole 18. The fastened section 71 is fastened to the valve plate 17 and is continuous with the valve plate 17. The joining section 72 joins the opening/closing section 70 to the fastened section 71 and has the opening 73. The suction reed 75 is configured such that the opening/closing section 60, the fastened section 61 and the joining section 62 extend in the direction in which the symmetric axis M extends. It should be noted that the suction reed 75 is preferably symmetric with respect to the symmetric axis M to suppress a twist operation in a width direction (direction perpendicular to the symmetric axis M). Although in the example of FIG. 9, the entire suction reed 75 is symmetric with respect to the symmetric axis M, the fastened section 71 may not be symmetric with respect to the symmetric axis M. Although the opening/closing section 70 is preferably symmetric with respect to the symmetric axis M from the above stated view points, it may not be symmetric with respect to the symmetric axis M. The joining section 72 is preferably symmetric with respect to the symmetric axis M, to a greatest possible degree.

The opening 73 extends to cross the symmetric axis M. An outer periphery 81 of the opening 73 is symmetric with respect to the symmetric axis M. In a portion of the joining section 72 which is closer to the opening/closing section 70, a pair of portions (hereinafter will be referred to as first outer peripheral portions) 82 of the outer periphery 81 of the opening 73 which are closest to both ends of the joining section 72 (herein, this limitation is unnecessary) are symmetric with respect to the symmetric axis M so as to form a substantially-V-shape or substantially-U-shape, in a direction from the opening/closing section 70 toward the fastened section 71. In other words, the first outer peripheral portions 82 are symmetric with respect to the symmetric axis M so as to form a substantially-V-shape or substantially-U-shape such that a distance between the first outer peripheral portions 82 in the direction perpendicular to the symmetric axis M gradually increases (the first outer peripheral portions 82 are gradually spaced apart from each other). Also, in a portion of the joining section 72 which is closer to the fastened section 71, a pair of portions (hereinafter will be referred to as second outer peripheral portions) 83 of the outer periphery 81 of the opening 73 which are closest to the both ends of the joining section 72 (herein, this limitation is unnecessary) are symmetric with respect to the symmetric axis M so as to form a substantially-V-shape or substantially-U-shape such that a distance between the second outer peripheral portions 83 in the direction perpendicular to the symmetric axis M gradually increases (the second outer peripheral portions 83 are gradually spaced apart from each other). In brief, the outer periphery 81 of the opening 73 includes the pair of first outer peripheral portions 82 and the pair of second outer peripheral portions 83. The pair of first outer peripheral portions 82 and the pair of second outer peripheral portions 83 are portions of the outer periphery of one opening extending to cross the symmetric axis. Thus, a width of the opening 73 in the direction perpendicular to the symmetric axis M is smaller toward the both ends and is greater toward the center.

Since the suction reed 75 has the opening 73, a spring constant of the suction read 75 is decreased. This makes it possible to reduce a load for deforming the suction reed 75, and reduce energy consumed for the suction reed 75 to open and close the suction hole 18. Moreover, time required for the suction reed 75 to open and close the suction hole 18 is reduced, and hence it is possible to avoid a situation in which the suction hole 18 is opened and closed at a later timing.

The opening 73 has an opening/closing section side portion (potion at opening/closing section side) 73a, and a fastened section side portion (portion at fastened section side) 73b in a range where the suction reed 75 is likely to be deformed to a great degree. A width of the suction reed 75 in this range is greater than a width of the suction read 75 in the range of the intermediate portion 73c. Therefore, a reduction of the spring constant and a reduction of the bending strength of the suction reed 75 in this range are mitigated, which makes it possible to mitigate local concentration of a stress generated in the joining section 72 by displacement of the opening/closing section 70. As a result, a durability of the suction reed 75 can be improved, and a highly reliable compressor can be provided.

Since the suction reed 75 has the opening 73, an area of a portion of the suction reed 75 and a portion of the valve plate 17, which portions contact each other, can be reduced. This can reduce the suction force due to the lubricating oil 2 staying between the suction reed 75 and the valve plate 17, which allows the suction reed 75 to easily move away from the valve plate 17. As a result, a force for opening the suction hole 18 is reduced, and the efficiency of the compressor can be improved.

[Modified Example 5]

Figure 10A:
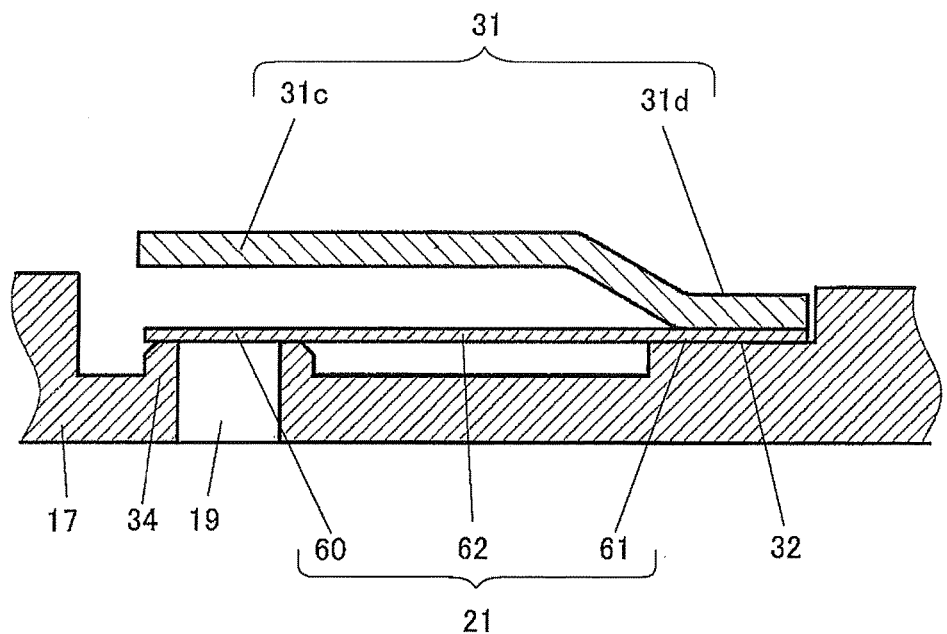
FIG. 10A is a cross-sectional view showing a state in which a discharge reed closes a discharge hole in a valve device according to Modified example 5 of Embodiment 1.
Figure 10B:
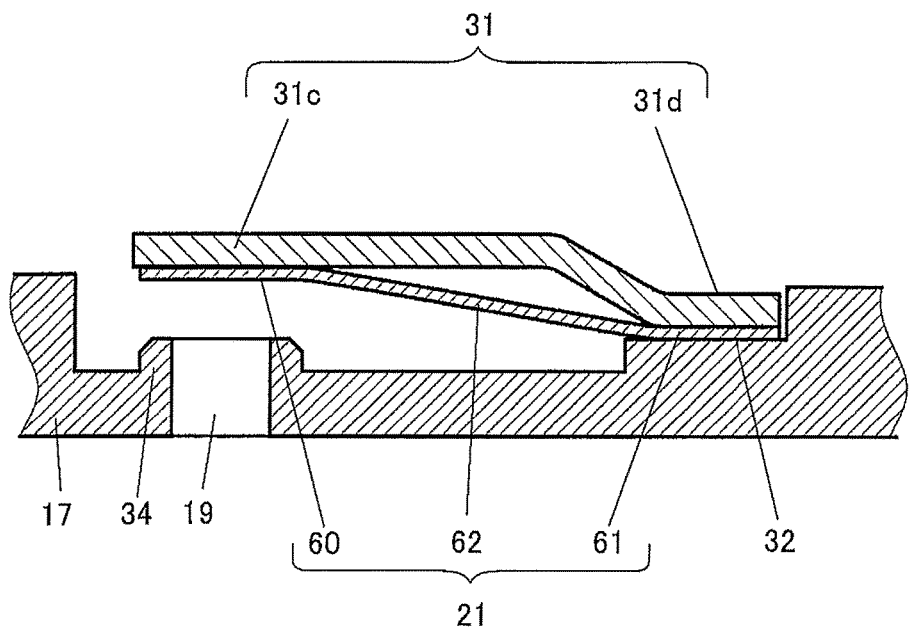
FIG. 10B is a cross-sectional view showing a state in which the discharge reed opens the discharge hole in the valve device according to Modified example 5 of Embodiment 1.

As shown in FIG. 3, the valve device includes the valve plate 17, the discharge reed 21, the spring reed 30 and the valve stop 31. Alternatively, the valve device may not include the spring reed 30, but include the valve plate 17, the discharge reed 21 and the valve stop 31. In this case, the valve stop 31 is a stopper which directly defines a greatest opening degree of the discharge reed 21. For example, as shown in FIGS. 10A and 10B, the valve stop 31 has a length smaller than a length of the recess. The valve stop 31 includes a fastening section 31d and a limiting section 31c. For example, the fastening section 31d fastens the fastened section 61 of the discharge reed 21 to the seat 32 of the valve plate 17. The limiting section 31c is bent with respect to the fastened section 61 in a direction away from the discharge hole 19. Thus, a space is formed between the limiting section 31c and the discharge hole 19. The opening/closing section 60 is vertically movably placed in this space. A height of this space is smaller than a greatest displacement amount of the opening/closing section 60.

As shown in FIG. 10A, in a state in which the discharge reed 21 closes the discharge hole 19, the discharge reed 21 extends in parallel with the limiting section 31c of the valve stop 31 with a gap between them. As shown in FIG. 10B, when the discharge reed 21 opens the discharge hole 19, the opening/closing section 60 contacts the limiting section 31c of the valve stop 31, and the discharge reed 21 is bent in a S-shape.

Although the valve device does not include the spring reed 30, the discharge reed 21 has the opening 63 and the limiting section 31c limits the movement of the discharge reed 21. This makes it possible to avoid a situation in which the discharge hole 19 is closed at a later timing, and prevent a reduction of the energy efficiency when the discharge reed 21 closes, and a reduction of a durability of the discharge reed 21. Moreover, since the valve device does not include the spring reed 30, the number of components and manufacturing cost can be reduced.

(Embodiment 2)

In Embodiment 1, the opening 63 is formed by the wide hole, while in Embodiment 2, the opening is formed by a slit (narrow hole) 65.

Figure 11:
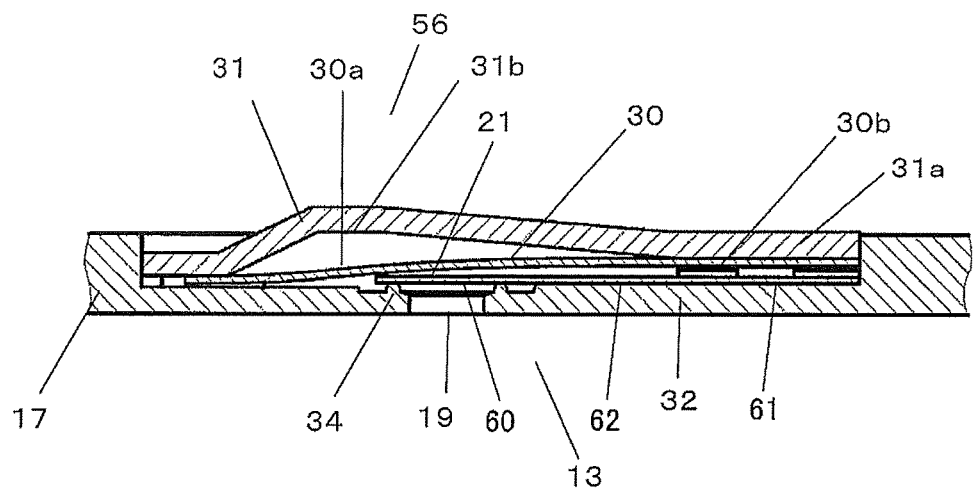
FIG. 11 is an exploded perspective view showing a compression component for use in a sealed compressor according to Embodiment 2 of the present invention.
Figure 12:
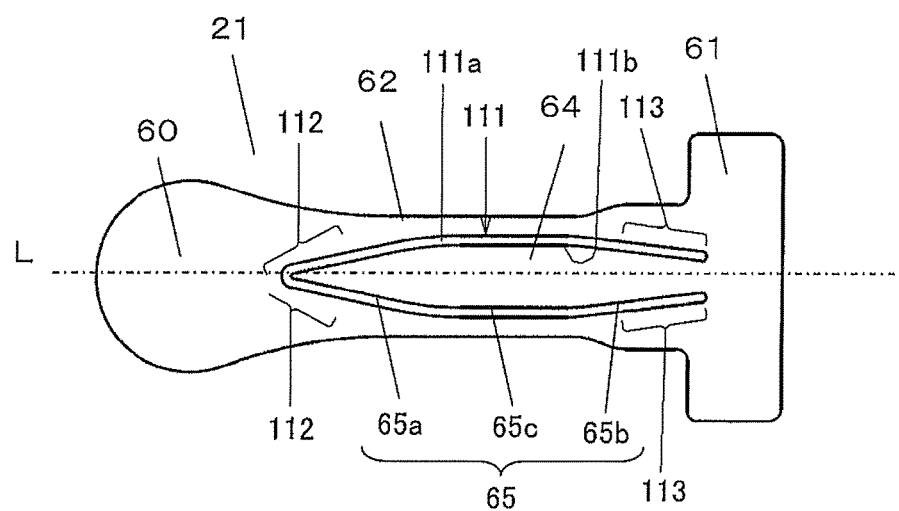
FIG. 12 is a plan view showing a configuration of a discharge reed for use in a valve device of FIG. 11.

FIG. 11 is a longitudinal sectional view of a valve device of Embodiment 2. FIG. 12 is a plan view showing a configuration of the discharge reed 21 for use in the valve device.

The slit 65 extends to cross the symmetric axis L. The slit 65 is an opening formed in the joining section 62 of the discharge reed 21. An outer periphery 111 of the slit 65 has an outer portion 111a and an inner portion 111b provided inward relative to the outer portion 111a to extend in parallel with the outer portion 111a. The outer periphery 111 of the slit 65 is symmetric with respect to the symmetric axis L. The slit 65 includes a pair of first outer peripheral portions 112, a portion extending in parallel with the pair of first outer peripheral portions 112, a pair of second outer peripheral portions 113, and a portion extending in parallel with the second outer peripheral portions 113. In a portion of the joining section 62 which is closer to the opening/closing section 60, a pair of portions (hereinafter will be referred to as first outer peripheral portions) 112 of the slit 65 which are closest to both ends of the joining section 62 are symmetric with respect to the symmetric axis L so as to form a substantially-V-shape or substantially-U-shape, in a direction from the opening/closing section 60 toward the fastened section 61. In other words, the pair of first outer peripheral portions 112 form a substantially-V-shape or substantially-U-shape such that a distance between the first outer peripheral portions 112 in a direction perpendicular to the symmetric axis L gradually increases. In a portion of the joining section 62 which is closer to the fastened section 61, a pair of portions (second outer peripheral portions) 113 which are closest to the both ends of the joining section 62 are symmetric with respect to the symmetric axis L so as to form a substantially-V-shape or substantially-U-shape, in a direction from the fastened section 61 toward the opening/closing section 60. In other words, the pair of second outer peripheral portions 113 form a substantially-V-shape or substantially-U-shape such that a distance between the second outer peripheral portions 113 in the direction perpendicular to the symmetric axis L gradually increases. The outer periphery 111 of the slit 65 which is closest to both ends of the joining section 62, in the portion of the joining section 62 which is closer to the opening/closing section 60 and in the portion of the joining section 62 which is closer to the fastened section 61, is the outer portion 111a. In brief, the outer periphery 111 of the slit 65 includes the pair of first outer peripheral portions 112 and the pair of second outer peripheral portions 113. A width of the outer periphery 111 of the slit 65 in the direction perpendicular to the symmetric axis L is smaller toward the both ends and is greater toward the center. A length of the outer periphery 111 of the slit 65 in the direction of the symmetric axis L is greater than a width of the opening/closing section 60 in the direction perpendicular to the symmetric axis L.

Specifically, the slit 65 includes an opening/closing section side portion (potion at opening/closing section side) 65a, a fastened section side portion (portion at fastened section side) 65b and an intermediate portion 65c. The opening/closing section side portion 65a extends gradually away in the direction perpendicular to the symmetric axis L, from the opening/closing section 60 side toward the fastened section 61, from a point on the symmetric axis L. The opening/closing section side portion 65a has a substantially-V-shape or substantially-U-shape which is symmetric with respect to the symmetric axis L. The fastened section side portion 65b extends gradually away in the direction perpendicular to the symmetric axis L from the fastened section 61 side toward the opening/closing section 60, from two points which are equally distant from the symmetric axis L. The fastened section side portion 65b has a substantially-V-shape or substantially-U-shape which is symmetric with respect to the symmetric axis L. The intermediate portion 65c joins the opening/closing section side portion 65a to the fastened section side portion 65b. The intermediate portion 65c extends in parallel with the symmetric axis L.

A tongue-shaped section 64 is formed by a portion of the discharge reed 21 which is surrounded by the inner portion 111b of the outer periphery 111 of the slit 65, and is positioned at a center portion of the discharge reed 21. A width of the tongue-shaped section 64 in the direction perpendicular to the symmetric axis L is smaller toward its both ends and is greater toward the center. A length of the tongue-shaped section 64 in the direction of the symmetric axis L is set greater than the width of the opening/closing section 60 in the direction perpendicular to the symmetric axis L. The tongue-shaped section 64 is vertically movable. When the discharge reed 21 moves up or moves down, the tongue-shaped section 64 moves away from the discharge reed 21 and an opening is also formed in the center portion of the discharge reed 21.

The width of the tongue-shaped section 64 is greatest in a range of the intermediate portion 65c. Because of this structure, portions of the discharge reed 21, corresponding to the opening/closing section side portion 65a and the fastened section side portion 65b, have a greater width than a portion of the discharge reed 21 corresponding to the intermediate portion 65c, and therefore have a greater spring constant and great bending strength.

Figure 13A:
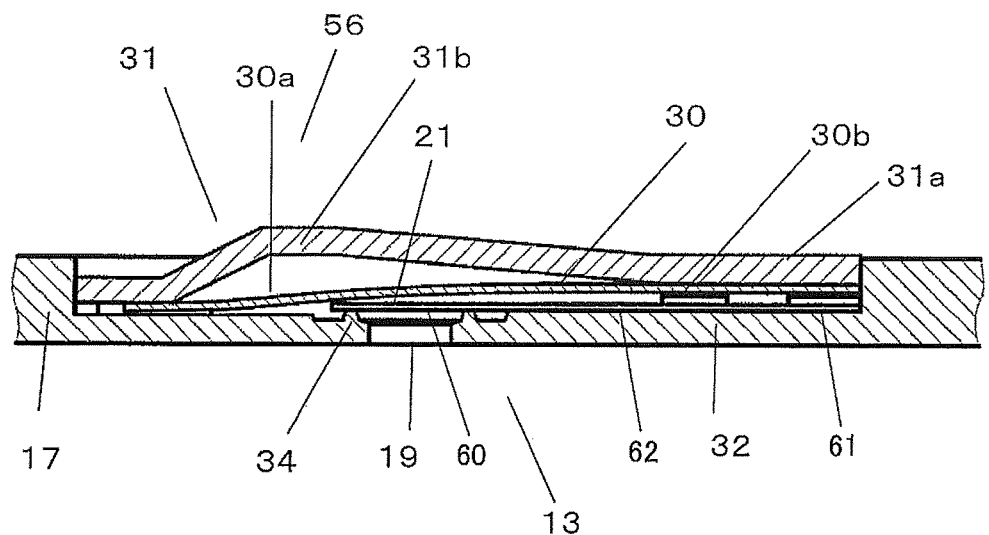
FIG. 13A is a cross-sectional view showing a state in which the discharge reed of FIG. 11 closes the discharge hole.
Figure 13B:
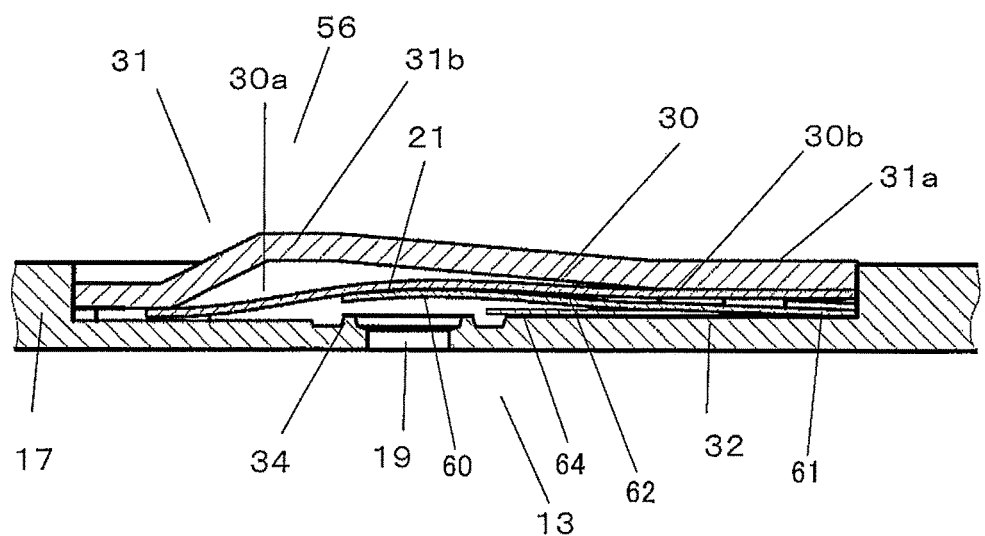
FIG. 13B is a cross-sectional view showing a state in which the discharge reed of FIG. 13A opens the discharge hole.

An operation of the valve device including the above described discharge reed 21 is similar to that of Embodiment 1, as shown in FIGS. 13A and 13B, except for how to open the discharge hole 19 by the discharge reed 21.

FIG. 13A is a cross-sectional view showing a state in which the discharge reed 21 closes the discharge hole 19. FIG. 13B is a cross-sectional view showing a state in which the discharge reed 21 opens the discharge hole 19.

In the state of FIG. 13A, the opening/closing section 60 of the discharge reed 21 closes the discharge hole 19. The joining section 62 of the discharge reed 21 is put on the seat 32 of the valve plate 17. Therefore, the opening/closing section 60 of the discharge reed 21 contacts the seat surface 34 of the valve plate 17 via the lubricating oil 2, and the joining section 62 and the tongue-shaped section 64 of the discharge reed 21 contact the seat 32 of the valve plate 17 via the lubricating oil 2. Due to a surface tension of the lubricating oil 2, the opening/closing section 60 and the joining section 62 of the discharge reed 21 are suctioned onto the seat surface 34 of the valve plate 17 and the seat 32 of the valve plate 17, respectively.

When the force for pushing up the opening/closing section 60, due to the pressure difference between the head space 56 and the compression chamber 13, exceeds the suction force of the lubricating oil 2, the force applied by the spring reed 30a to push down the opening/closing section 60, and the force for elastically deforming the joining section 62 of the discharge reed 21, the opening/closing section 60 moves up and opens the discharge hole 19 as shown in FIG. 13B.

According to this, the tongue-shaped section 64 remains in contact with the seat 32, but the joining section 62 around the tongue-shaped section 64 moves away from the seat 32 of the valve plate 17. The discharge reed 21 which is away from the seat 32 of the valve plate 17 contacts the spring reed 30. At this time, even when the discharge reed 21 moves vertically to open and close the discharge hole 19, the tongue-shaped section 64 is not displaced, and is kept in contact with the seat 32 of the valve plate 17. Because of this, an area of a portion of the discharge reed 21 and a portion of the spring reed 30 which portions contact each other is reduced, by an area of the tongue-shaped section 64. Therefore, when the discharge reed 21 closes, it easily moves away from the spring reed 30.

When the opening/closing section 60 is displaced to a greatest degree until the spring reed 30 contacts the valve stop 31, the fastened section 61 is also displaced a little. Therefore, the tongue-shaped section 64 is displaced a little according to the displacement of the fastened section 61.

Hereinafter, a load applied to the discharge reed 21 when the discharge hole 19 is opened and closed as described above will be described.

Figure 14A:
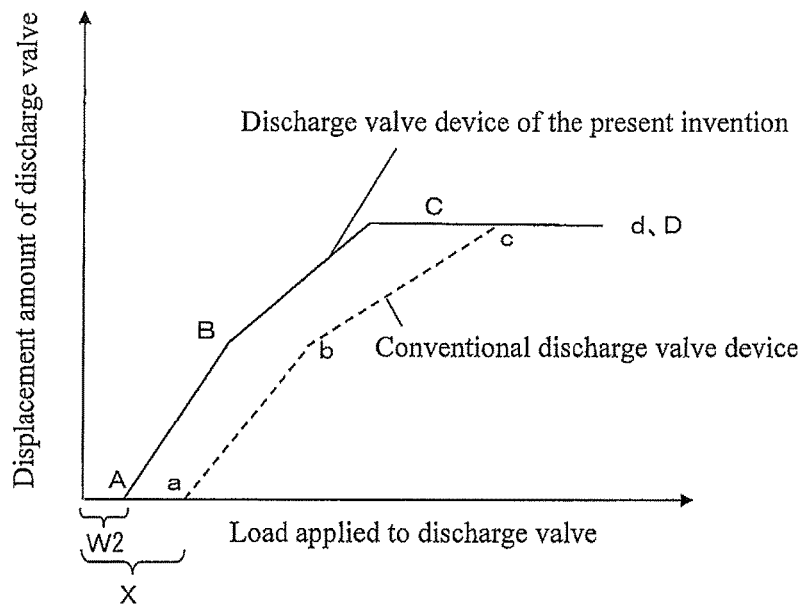
FIG. 14A is a graph showing a relationship between a load applied to the discharge reed, and a displacement amount of the discharge reed, when the discharge reed opens the discharge hole in the example shown in FIGS. 13A and 13B.
Figure 14B:
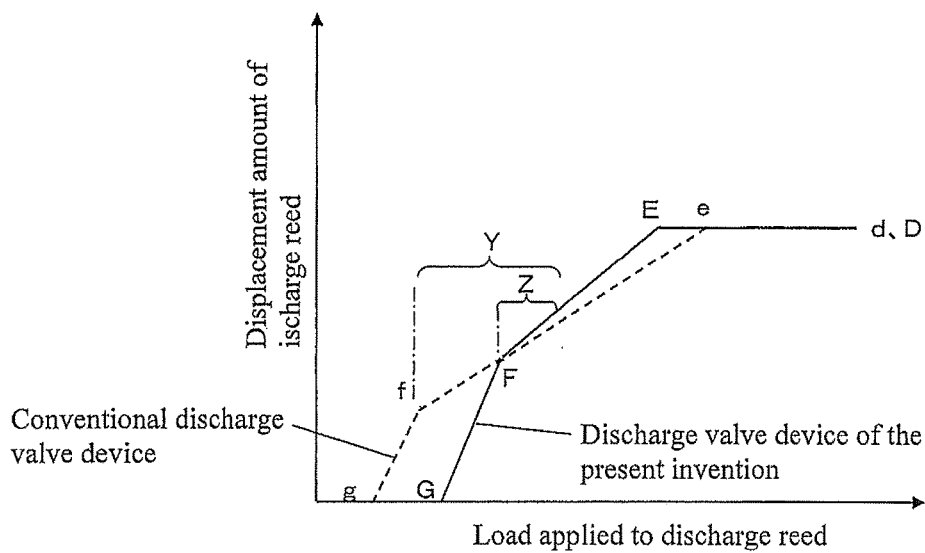
FIG. 14B is a graph showing a relationship between a load applied to the discharge reed, and a displacement amount of the discharge reed, when the discharge reed closes the discharge hole in the example shown in FIGS. 13A and 13B.

FIG. 14A is a graph schematically showing a relationship between a displacement amount of the discharge reed 21 and the load applied to the discharge reed 21 when the discharge reed 21 opens. FIG. 14B is a graph schematically showing a relationship between a displacement amount of the discharge reed 21 and the load applied to the discharge reed 21 when the discharge reed 21 closes. In each graph, a vertical axis indicates the displacement amount of the discharge reed 21, while a horizontal axis indicates the load applied to the discharge reed 21. Also, in each graph, a solid line indicates the relationship of the discharge reed 21 having the slit 65 of Embodiment 2, while a broken line indicates the relationship of the discharge reed which does not have the slit 65 of Embodiment 2.

As shown in FIG. 14A, when the discharge reed 21 opens the discharge hole 19, the discharge reed 21 of Embodiment 2 is displaced in the order of A, B, C, and D as the load increases. The conventional discharge reed opens in the order of a, b, c, and d as the load increases.

In this case, when the discharge reed 21 is moving upward, the tongue-shaped section 64 opens in the joining section 62. In a case where the tongue-shaped section 64 is equal in size to the opening 63 of Embodiment 1, an area of a portion of the discharge reed 21 with the tongue-shaped section 64 open and a portion of the valve plate 17, which portions contact each other is equal to the area of the portion of the discharge reed 21 having the opening 63 and the portion of the valve plate 17, which portions contact each other. However, the tongue-shaped section 64 is in contact with the valve plate 17 via the lubricating oil or the like, and therefore, the discharge reed 21 which is likely to open is pulled by the tongue-shaped section 64. Therefore, a load W2 required for the discharge reed 21 having the slit 65 to cut off the suction force of the lubricating oil 2 with respect to the valve plate 17 is somewhat greater than a load W1 required for the discharge reed 21 having the opening 63 of FIG. 6A to cut off the suction force of the lubricating oil 2 with respect to the valve plate 17. However, the area of the portion of the discharge reed 21 with the tongue-shaped section 64 open and the portion of the valve plate 17, which portions contact each other, is smaller than the area of the portion of the discharge reed 21 which does not have the slit 66 and the portion of the valve plate 17, which portions contact each other. Because of this, the load W2 required for the discharge reed 21 to cut off the suction force of the lubricating oil 2 is smaller than the load X required for the conventional discharge reed 21 which does not have the slit 65 to cut off the suction force of the lubricating oil 2. As a result, the suction force of the lubricating oil 2 in the discharge reed 21 having the slit 65 is reduced, and the load for opening the discharge reed 21 is reduced. In addition, the spring constant of the discharge reed 21 is reduced, and the load for deforming the discharge reed 21 is reduced. Therefore, it is possible to avoid a situation in which the discharge hole 19 is opened at a later timing, and energy necessary for opening the discharge hole 19 is reduced. As a result, efficiency of the sealed compressor can be improved.

As shown in FIG. 14B, when the discharge reed 21 closes the discharge hole 19, the discharge reed 21 of Embodiment 2 is displaced in the order of D, E, F, and G as the load decreases. The discharge reed of the conventional valve device goes through a similar course, and is displaced in the order of d, e, f, and g as the load decreases.

This case is similar to the case where the discharge reed 21 opens the discharge hole 19. Because of this, a load Z required for the discharge reed 21 having the slit 65 to cut off the suction force of the lubricating oil 2 with respect to the spring reed 30 is somewhat greater than a load Z required for the discharge reed 21 having the opening 63 of FIG. 6B to cut off the suction force of the lubricating oil 2 with respect to the spring reed 30. However, the load Z required for the discharge reed 21 having the slit 65 to cut off the suction force of the lubricating oil 2 is smaller than a load Y required for the conventional discharge reed 21 which does not have the slit 65 to cut of the suction force of the lubricating oil 2. As a result, the load for closing the discharge reed 21 is reduced. In addition, the spring constant of the discharge reed 21 is reduced, and the load for deforming the discharge reed 21 is reduced. Therefore, it is possible to avoid a situation in which the discharge hole 19 is closed at a later timing, energy necessary for closing the discharge hole 19 is reduced, and re-inflow of the working fluid 3 into the compression chamber 13 is suppressed. Thus, a reduction of a refrigeration capability of the sealed compressor can be mitigated.

Figure 15A:
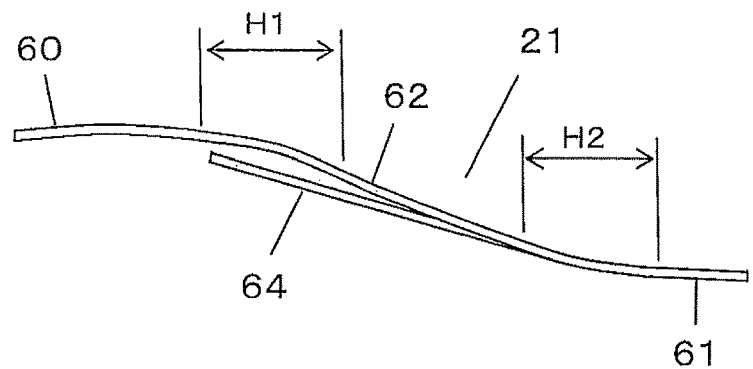
FIG. 15A is a side view schematically showing a stress generated in the deformed discharge reed.
Figure 15B:
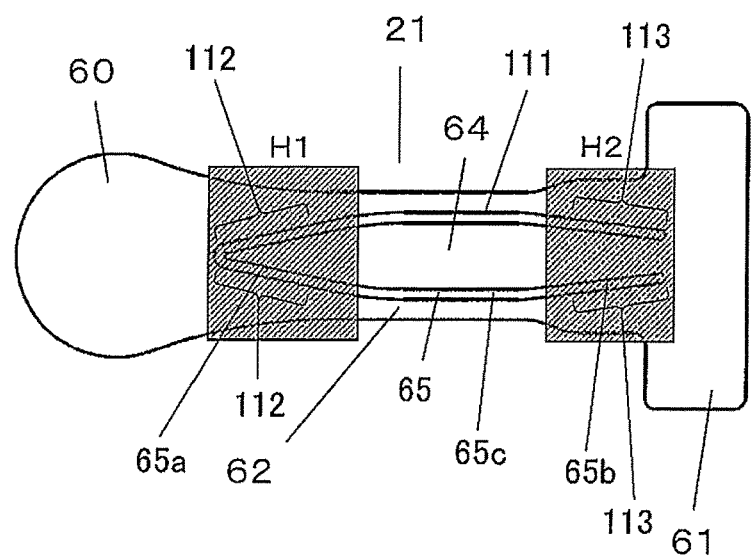
FIG. 15B is a plan view schematically showing a stress generated in the discharge reed of FIG. 15A.

The stress generated in the discharge reed 21 of Embodiment 2 is similar to that of the discharge reed 21 of Embodiment 1, as shown in FIGS. 15A and 15B. FIG. 15A is a side view showing the deformed discharge reed 21. FIG. 15B is a plan view showing the deformed discharge reed 21.

Specifically, when the discharge reed 21 is displaced to a greatest degree and deformed in a S-shape, the discharge reed 21 is likely to be bent to a great degree in a range of H1 and a range of H2, i.e., at both ends of the joining section 62. As shown in FIG. 15B, a width of the discharge reed 21 in the range of H1 and the range of H2, is greater than a width of the discharge reed 21 in a range of the intermediate portion 65c. Therefore, a spring constant of the discharge reed 21 in the range of H1 and the range of H2 is greater than a spring constant of the discharge reed 21 in the range of the intermediate portion 65c. A bending angle of the discharge reed 21 in the range of H1 and the range of H2 is smaller, while a bending angle of the discharge reed 21 in the range of the intermediate portion 65c is greater. This allows the bending angle of the discharge reed 21 to be uniform as a whole, which prevents concentration of the stress. Bending strength of the discharge reed 21 in the range of H1 and the range of H2 is great. Therefore, the discharge reed 21 is not fractured, and a reduction of a durability of the discharge reed 21 is prevented.

[Modified Example 6]

Figure 16:
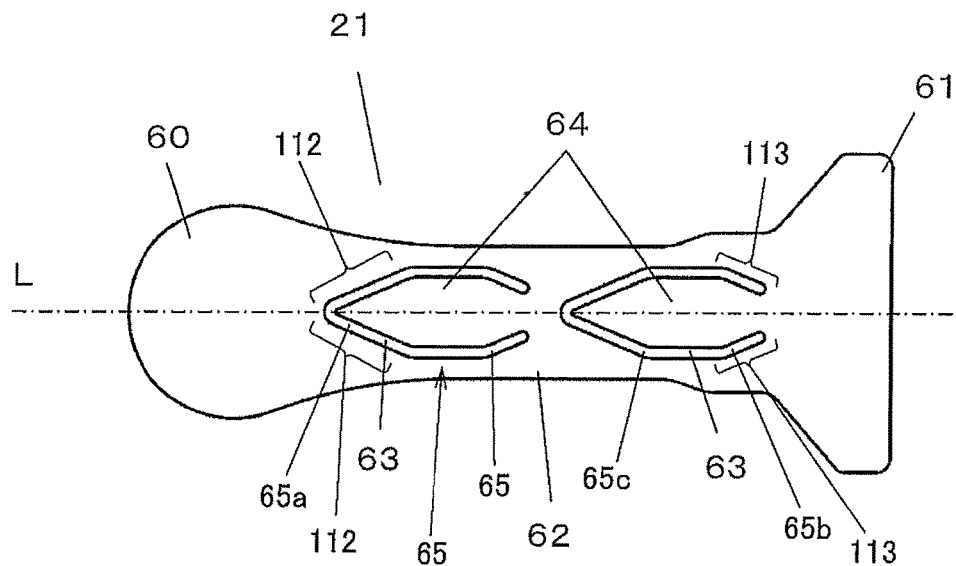
FIG. 16 is a plan view showing a discharge reed according to Modified example 6 of Embodiment 2.

Although the discharge reed 21 of FIG. 12 has one slit 65, the number of slits 65 is not limited to this, and the discharge reed 21 may be provided with a plurality of slits 65. For example, as shown in FIG. 16, two slits 65 are arranged in parallel, in the direction of the symmetric axis L. In this case, also, the two slits 65 are formed by two slits 65. A blank is provided between these two slits 65. Since the two slits 65 can be assumed as one slit 65 which is unitarily joined together, the same advantages as those of FIG. 12 can be achieved. It should be noted that there is no technical significance in providing three or more slits 65.

[Modified Example 7]

Although the slit 65 of the discharge reed 21 of FIG. 12 includes the opening/closing section side portion 65a, the fastened section side portion 65b and the intermediate portion 65c, the shape of the slit 65 is not limited to this. It is sufficient that the slit 65 has a shape which is symmetric with respect to the symmetric axis L and is narrow in the range of both ends in the direction of the symmetric axis L. For example, the slit 65 may have a rhombus shape or an oval shape.

[Modified Example 8]

Although the length of the tongue-shaped section 64 of the discharge reed 21 of FIG. 12 in the direction of the symmetric axis L, is greater than the width of the opening/closing section 60 in the direction perpendicular to the symmetric axis L, it may be equal to or smaller than the width of the opening/closing section 60 in the direction perpendicular to the symmetric axis L. In this case, the same advantages as those of FIG. 12 can be achieved. For example, when the length of the tongue-shaped section 64 in the direction of the symmetric axis L, is smaller than the width of the opening/closing section 60 in the direction perpendicular to the symmetric axis L, the opening/closing section 60 is not inserted into the opening formed by opening the tongue-shaped section 64. In the tumbling step or the like, many discharge reeds 21 are loaded into the barrel and rolled. In this case, it becomes possible to avoid a situation in which the opening/closing sections 60 are inserted into the openings, respectively, and thereby the discharge reeds 21 get tangled and bent. In this way, a problem in manufacturing process steps can be mitigated, and a productivity can be improved.

[Modified Example 9]

Figure 17:
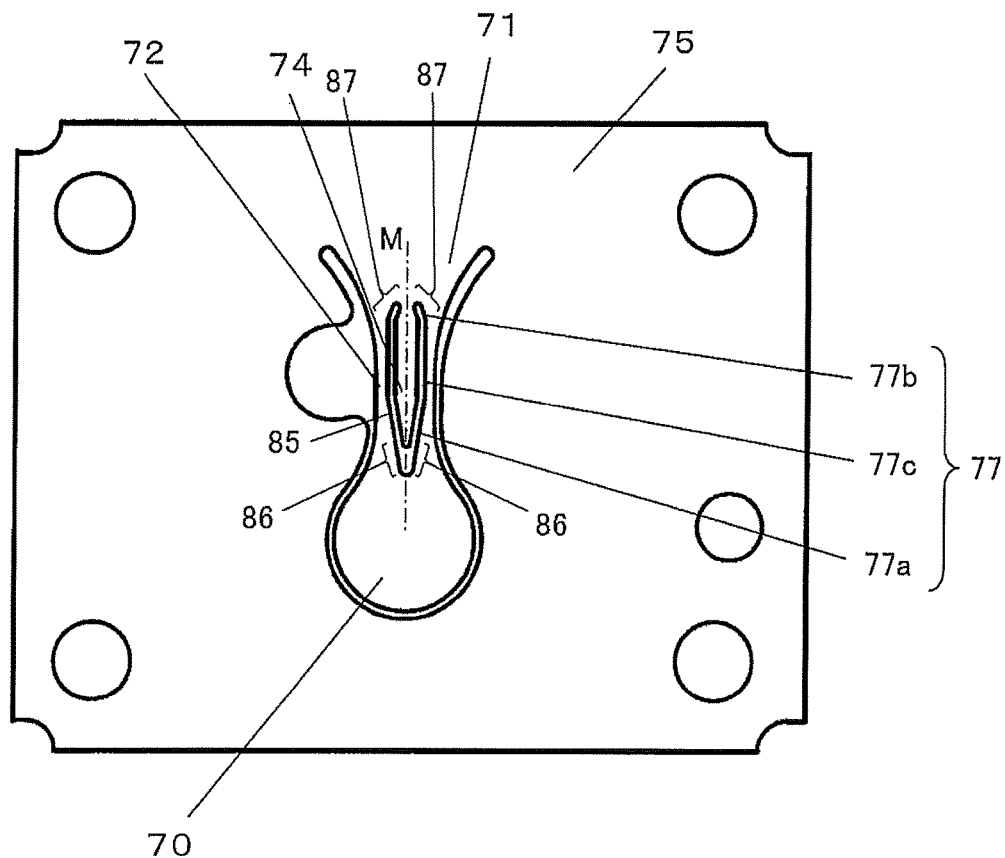
FIG. 17 is a plan view showing a configuration of a suction reed according to Modified example of Embodiment 2.

Although the discharge reed 21 of FIG. 12 has the slit 77, the suction reed 75 of FIG. 17 may have the slit 77.

The suction reed 75 includes the opening/closing section 70, the fastened section 71 and the joining section 72. The opening/closing section 70 opens and closes the suction hole 18 and has a circular shape which is greater in dimension than the suction hole 18. The fastened section 71 is fastened to the valve plate 17 and is continuous with the valve plate 17. The joining section 72 joins the opening/closing section 70 to the fastened section 71 and has the slit 77.

The slit 77 extends to cross the symmetric axis M. The slit 77 is an opening formed in the joining section 72 of the suction reed 75. An outer periphery 85 of the slit 77 includes an outer portion and an inner portion formed inward relative to the outer portion and extending in parallel with the outer portion. The outer periphery 85 of the slit 77 is symmetric with respect to the symmetric axis M. The slit 77 includes a pair of first outer peripheral portions 86 and a portion extending in parallel with the pair of first outer peripheral portions 86, and/or a pair of second outer peripheral portions 87 and a portion extending in parallel with the pair of second outer peripheral portions 87. In a portion of the joining section 72 which is closer to the opening/closing section 70, a pair of portions (first outer peripheral portions) 86 of the outer periphery of the slit 77 which are closest to both ends of the joining section 72 are symmetric with respect to the symmetric axis M so as to form a substantially-V-shape or substantially-U-shape, in a direction from the opening/closing section 70 toward the fastened section 71. In other words, the pair of first outer peripheral portions 86 form a substantially-V-shape or substantially-U-shape such that a distance between the first outer peripheral portions 86 in the direction perpendicular to the symmetric axis M gradually increases. Also, in a portion of the joining section 72 which is closer to the fastened section 71, a pair of portions (second outer peripheral portions) 87 of the outer periphery of the slit 77 which are closest to the both ends the joining section 72 are symmetric with respect to the symmetric axis M so as to form a substantially-V-shape or substantially-U-shape, in the direction from the fastened section 71 toward the opening/closing section 70. In other words, the pair of second outer peripheral portions 87 form a substantially-V-shape or substantially-U-shape such that a distance between the second outer peripheral portions 87 in the direction perpendicular to the symmetric axis M gradually increases. In brief, the outer periphery 85 of the slit 77 includes the pair of first outer peripheral portions 86 and the pair of second outer peripheral portions 87. Thus, a width of the outer periphery 85 of the slit 77 in the direction perpendicular to the symmetric axis M is smaller toward the both ends and is greater toward the center. A length of the outer periphery 85 of the slit 77 in the direction of the symmetric axis M is greater than the width of the opening/closing section 70 in the direction perpendicular to the symmetric axis M.

Since the suction reed 75 has the opening 73 formed by the slit 77, a spring constant of the suction read 75 is decreased. This makes it possible to reduce a load for deforming the suction reed 75, and reduce energy required for the suction reed 75 to open and close the suction hole 18. Moreover, time required for the suction reed 75 to open and close the suction hole 18 is reduced, and hence it is possible to avoid a situation in which the suction hole 18 is opened and closed at a later timing.

The opening/closing section side portion 77a and the fastened section side portion 77b are formed in a range where the suction reed 75 is likely to be deformed to a great degree. The width of the suction reed 75 in this range is greater than the width of the suction reed 75 in a range where the intermediate portion 77c is formed. This makes it possible to mitigate a reduction of bending strength of the suction reed 75, which mitigates local concentration of the stress generated in the joining section 72 due to the displacement of the opening/closing section 70. As a result, a durability of the suction reed 75 is improved, and a highly reliable compressor is provided.

Since the opening 73 is formed in the suction reed 75 by the slit 77, an area of a portion of the suction reed 75 and a portion of the valve plate 17, which portions contact each other, is reduced. This can reduce the suction force due to the lubricating oil 2 staying between the suction reed 75 and the valve plate 17, which allows the suction reed 75 to easily move away from the valve plate 17. As a result, a force for opening the suction hole 18 is reduced, and the efficiency of the compressor is improved.

[Modified Example 10]

As shown in FIG. 3, the valve device includes the valve plate 17, the discharge reed 21, the spring reed 30 and the valve stop 31. Alternatively, the valve device may not include the spring reed 30, but include the valve plate 17, the discharge reed 21 and the valve stop 31. In this case, the valve stop 31 directly defines a greatest opening degree of the discharge reed 21. For example, the valve stop 31 which is similar to the valve stop 31 of FIGS. 10A and 10B is used.

(Embodiment 3)

In Embodiment 2, the discharge reed 21 is provided with the tongue-shaped section 64 surrounded by the slit 65. In Embodiment 3, the tongue-shaped section 64 is bent and has a contact portion 66.

Figure 18:
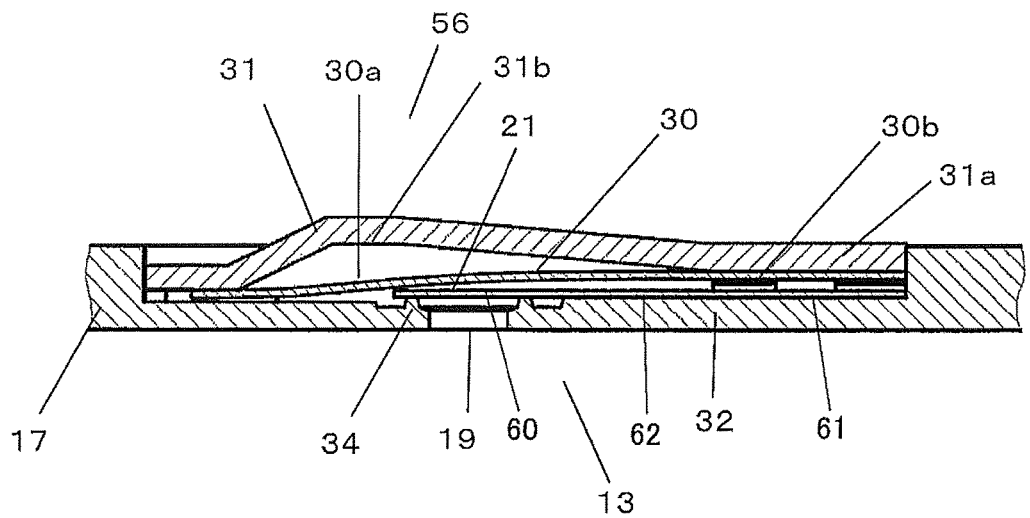
FIG. 18 is a cross-sectional view showing a valve device for use in a sealed compressor according to Embodiment 3 of the present invention.
Figure 19:
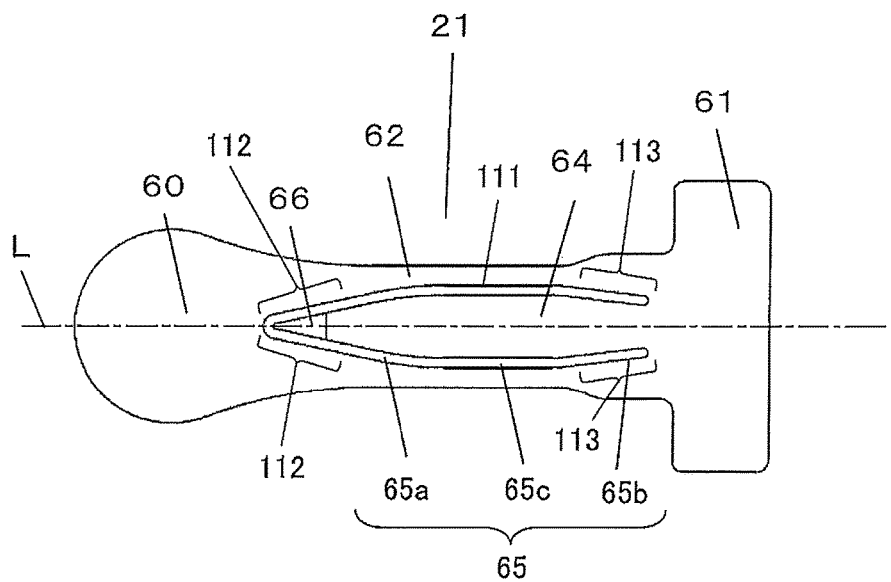
FIG. 19 is a plan view showing a configuration of a discharge reed for use in the valve device of FIG. 18.
Figure 20:
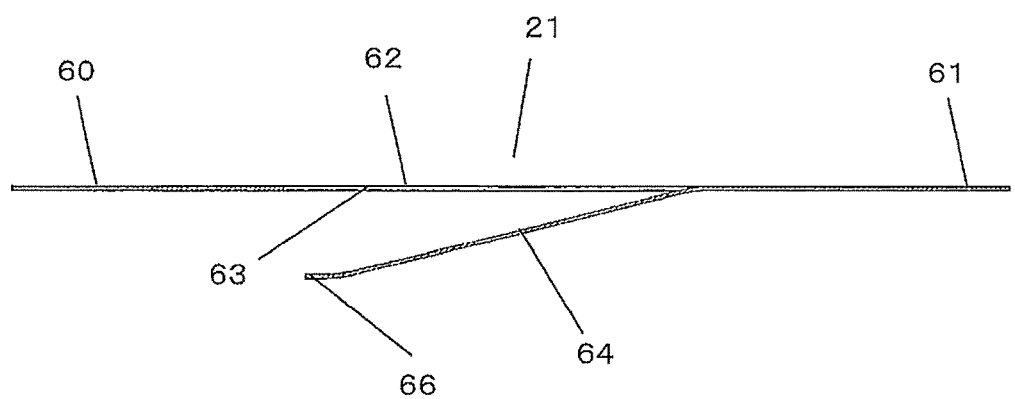
FIG. 20 is a side view showing the discharge reed of FIG. 19.

FIG. 18 is a longitudinal sectional view showing a valve device according to Embodiment 3. FIG. 19 is a plan view showing the discharge reed 21 for use in the valve device. FIG. 20 is a cross-sectional view showing the discharge reed 21 for use in the valve device.

The tongue-shaped section 64 is formed by a portion surrounded by the inner portion 111b of the outer periphery 111 of the slit 65, and is positioned at a center portion of the discharge reed 21. As shown in FIG. 20, the tongue-shaped section 64 is bent downward, i.e., in a direction to bias the discharge reed 21 so that the discharge reed 21 opens. Because of this, in the valve device, the tongue-shaped section 64 is bent toward the valve plate 17. This causes a force for pushing up the discharge reed 21 toward the spring reed 30 to act on the discharge reed 21.

The contact portion 66 is provided at the tip end portion of the tongue-shaped section 64 and is configured to contact the seat 32. The contact portion 66 is formed by bending upward the tip end portion of the tongue-shaped section 64. The contact portion 66 is inclined with respect to the tongue-shaped section 64 in a direction different from a direction in which the tongue-shaped section 64 is inclined with respect to the joining section 62. In this structure, an angle of the contact portion 66 with respect to the valve plate 17 is smaller than an angle of the tongue-shaped section 64 with respect to the valve plate 17.

Figure 21A:
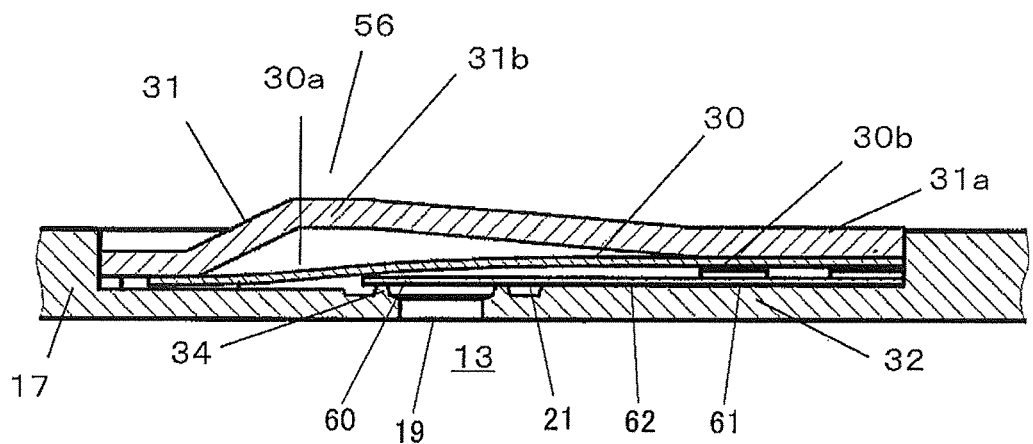
FIG. 21A is a cross-sectional view showing a state in which the discharge reed of FIG. 18 closes a discharge hole.
Figure 21B:
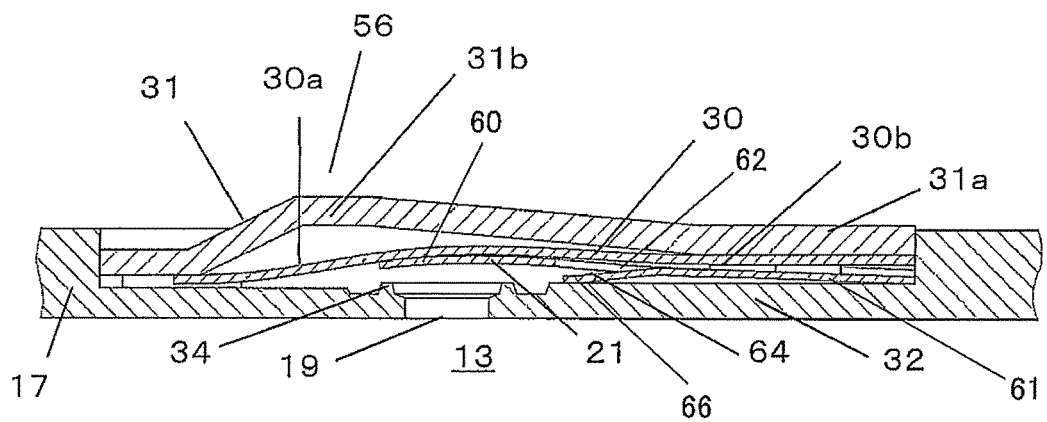
FIG. 21B is a cross-sectional view showing a state in which the discharge reed of FIG. 21A opens the discharge hole.
Figure 21C:
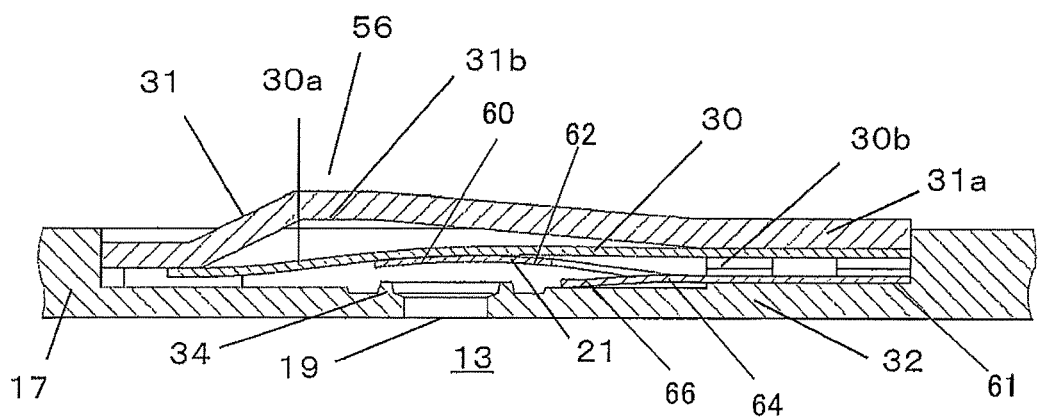
FIG. 21C is a cross-sectional view showing a state in which the discharge reed of FIG. 21B is displaced to a greatest degree.

An operation of the valve device including the above described discharge reed 21 is similar to that of Embodiment 1 and that of Embodiment 2 as shown in FIGS. 21A to 21C except for the operation of the tongue-shaped section 64 of the discharge reed 21.

FIG. 21A is a cross-sectional view showing a state in which the discharge reed 21 closes the discharge hole 19. FIG. 21B is a cross-sectional view showing a state in which the discharge reed 21 opens the discharge hole 19. FIG. 21C is a cross-sectional view showing a state in which the discharge reed 21 is displaced to a greatest degree.

In the state of FIG. 21A, the discharge reed 21 is pushed against the seat surface 34 by the force generated due to a pressure difference between the head space 56 and the compression chamber 13, and the discharge hole 19 is closed.

The pressure in the compression chamber 13 increases, and exceeds the pressure in the head space 56. When a sum of the force for pushing up the discharge reed 21 due to this pressure difference and the force for pushing up the discharge reed 21 by the elastic force of the tongue-shaped section 64 exceeds a force which is a sum of the force for elastically deforming the discharge reed 21 and the suction force due to the surface tension of the lubricating oil 2 which is generated between the discharge reed 21 and the seat surface 34 and the seat 32 of the discharge hole 19, the discharge reed 21 is displaced upward and the discharge hole 19 is opened, as shown in FIG. 21B.

After that, when the pressure in the compression chamber 13 further increases, and the force applied to the discharge reed 21 increases, the discharge reed 21 is deformed to a great degree as shown in FIG. 21C. The discharge reed 21 contacts the movable section 30a and is deformed together with the movable section 30a of the spring reed 30. When the pressure in the compression chamber 13 becomes higher than the pressure in the head space 56, the force for deforming the discharge reed 21 is further increased. Because of this, the discharge reed 21 and the movable section 30a are deformed together to a great degree, and the movable section 30a contacts the limiting section 31b.

After that, the pressure difference between the head space 56 and the compression chamber 13 decreases, and the force applied to the discharge reed 21 due to this pressure difference becomes smaller than a restoring force of the spring reed 30 and a restoring force of the discharge reed 21. Thereby, as shown in FIG. 21B, the discharge reed 21 and the spring reed 30 are displaced to close.

When the pressure difference further decreases, the restoring force of the discharge reed 21 and the restoring force of the spring reed 30 exceed the pressure difference between the head space 56 and the compression chamber 13, and the suction force due to the lubricating oil 2 staying between the discharge reed 21 and the movable section 30a. At this time, the discharge reed 21 moves away from the movable section 30a, and the opening/closing section 60 contacts the seat surface 34 of the valve plate 17, so that the discharge hole 19 is closed as shown in FIG. 21A. The contact portion 66 of the tongue-shaped section 64 contacts the seat 32 of the valve plate 17 before the opening/closing section 60 contacts the valve plate 17. When the discharge reed 21 is displaced to open and close the discharge hole 19 such that a displacement amount of the opening/closing section 60 is small, the contact portion 66 of the tongue-shaped section 64 maintains a state in which the contact portion 66 is in contact with the seat 32 of the valve plate 17. When the opening/closing section 60 is displaced to a greatest degree, the contact portion 66 moves away from the seat 32 of the valve plate 17 with a small distance. Therefore, a distance over which the contact portion 66 is displaced to contact the seat 32 is smaller than a distance over which the opening/closing section 60 is displaced to contact the seat surface 34. Further, the discharge reed 21 is biased upward by the elastic force of the tongue-shaped section 64, and a closing speed of the discharge reed 21 is reduced. Therefore, a noise generated when the contact portion 66 contacts the seat 32 is less than a noise generated when the opening/closing section 60 contacts the seat surface 34. Thus, a noise generated when the discharge reed 21 closes the discharge hole 19 can be mitigated.

Hereinafter, a load applied to the discharge reed 21 when the discharge hole 19 is opened and closed as described above will be described.

Figure 22A:
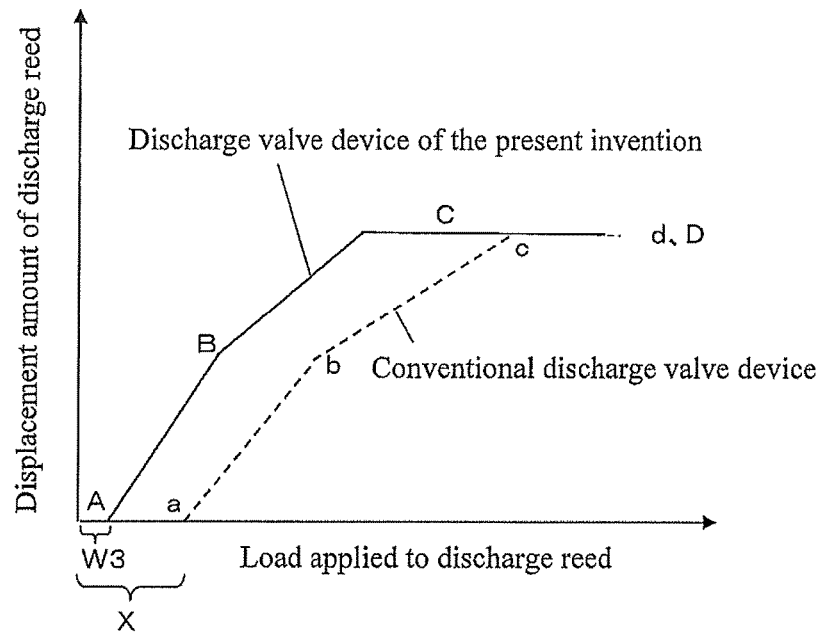
FIG. 22A is a graph showing a relationship between a load applied to the discharge reed, and a displacement amount of the discharge reed, when the discharge reed opens the discharge hole in the example shown in FIGS. 21A to 21C.
Figure 22B:
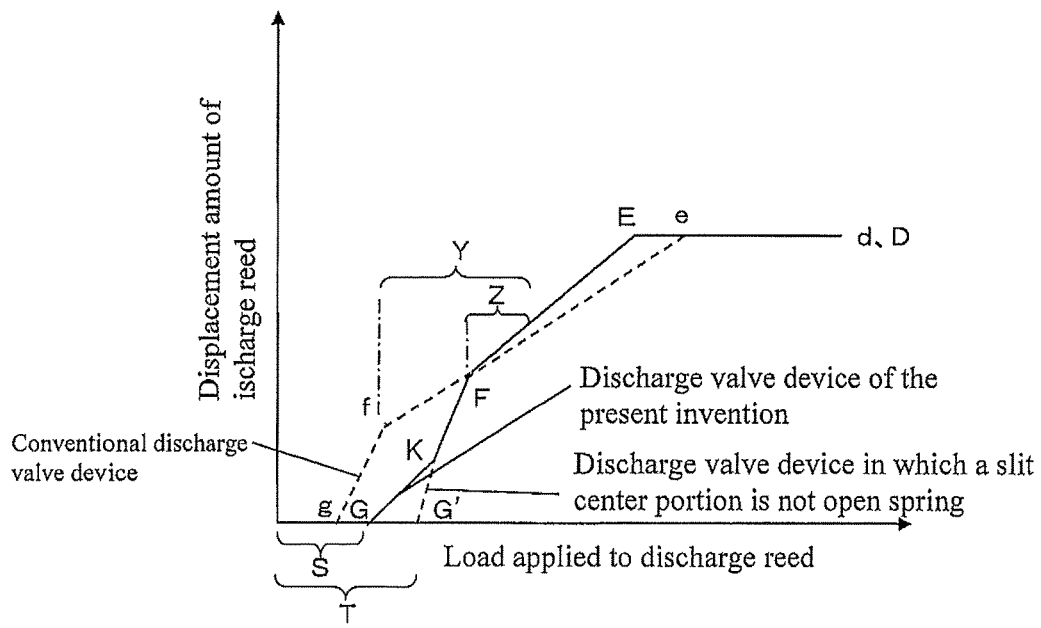
FIG. 22B is a graph showing a relationship between a load applied to the discharge reed, and a displacement amount of the discharge reed, when the discharge reed closes the discharge hole in the example shown in FIGS. 21A to 21C.

FIG. 22A is a graph schematically showing a relationship between a displacement amount of the discharge reed 21 and the load applied to the discharge reed 21 when the discharge reed 21 opens. FIG. 22B is a graph schematically showing a relationship between a displacement amount of the discharge reed 21 and a load applied to the discharge reed 21 when the discharge reed 21 closes. In each graph, a vertical axis indicates the displacement amount of the discharge reed 21 and a horizontal axis indicates the load applied to the discharge reed 21. A solid line indicates the relationship of the discharge reed 21 of Embodiment 3, while a broken line indicates the relationship of a conventional discharge reed which does not have the slit 65.

As shown in FIG. 22A, in the case where the discharge reed 21 opens the discharge hole 19, the discharge reed 21 of Embodiment 3 is displaced in the order of A, B, C, and D as the load increases. The conventional discharge reed is displaced in the order of a, b, c, and d as the load increases.

The relationship between the displacement amount and the load in the discharge reed 21 according to Embodiment 3 is the same as the relationship between the displacement amount and the load in the discharge reed 21 according to Embodiment 1 and Embodiment 2, except that the tongue-shaped section 64 biases discharge reed 21 so that the discharge reed 21 opens. Therefore, a load W3 required for the biased discharge reed 21 to cut off the suction force of the lubricating oil 2 with respect to the valve plate 17, shown in FIG. 22A, is smaller than a load W1 and a load W2 which are required for the discharge reed 21 which is not biased to cut off the suction force of the lubricating oil 2 with respect to the valve plate 17, shown in FIGS. 6A and 14A, respectively. The load W3 is smaller than the load X applied to the conventional discharge reed. As a result, the discharge reed 21 is biased by the tongue-shaped section 64. Since the discharge reed 21 has the slit 65, the load required for opening the discharge reed 21 is reduced. Therefore, it is possible to avoid a situation in which the discharge hole 19 is opened at a later timing, and energy necessary for opening the discharge hole 19 is reduced. As a result, efficiency of the sealed compressor can be improved.

In the example of FIG. 22B, in a case where the discharge reed 21 with the tongue-shaped section 64 bent, according to Embodiment 3, closes, the discharge reed 21 is displaced in the order of D, E, F, K, and G as the load decreases.

Specifically, at the point D, the discharge reed 21 is displaced to a greatest degree. At the point E, the spring reed 30 moves away from the valve stop 31. From the point E to the point F, the discharge reed 21 contacts the spring reed 30 and is deformed together with the spring reed 30 while contacting the spring reed 30. At the point F, the discharge reed 21 moves away from the spring reed 30. From the point F to the point K, the discharge reed 21 is deformed singly. At the point K, the contact portion 66 of the tongue-shaped section 64 contacts the seat 32 of the valve plate 17 and is deformed. Thereafter, at the point G, the opening/closing section 60 of the discharge reed 21 contacts the seat surface 34 of the valve plate 17 and closes the discharge hole 19.

In a case where the discharge reed 21 which is not biased by the tongue-shaped section 64, according to Embodiment 2, closes, the discharge reed 21 is displaced in the order of D, E, F, K, and G' as the load decreases. A course from the point D to the point K is the same as that of the discharge reed 21 of Embodiment 3. After that, at the point G', the opening/closing section 60 of the discharge reed 21 contacts the seat surface 34 of the valve plate 17 and closes the discharge hole 19.

A load indicated by S is strength of a load applied when the opening/closing section 60 of the discharge reed 21 contacts the seat surface 34 of the valve plate 17, i.e., an impact generated when the opening/closing section 60 contacts the seat surface 34 of the valve plate 17. The load S is smaller than a load T applied when the opening/closing section 60 of the discharge reed 21 in which the tongue-shaped section 64 is not bent contacts the seat surface 34. This is because the tongue-shaped section 64 is bent to bias the discharge reed 21 so that the discharge reed 21 opens, and therefore the contact portion 66 contacts the seat 32 before the opening/closing section 60 contacts the seat surface 34. This makes it possible to mitigate an impact generated when the opening/closing section 60 contacts the seat surface 34.

In the above described manner, it becomes possible to mitigate a noise of an impact generated when the opening/closing section 60 of the discharge reed 21 contacts the seat surface 34. Therefore, a noise generated during actuation of the compressor can be mitigated, and a quiet operation can be implemented.

When the conventional discharge reed which does not have the slit 65 closes, the discharge reed is displaced in the order of d, e, f, and g as the load decreases. This is the same as that of the conventional discharge reed described in Embodiment 1 and Embodiment 2. Therefore, the load Z required for the discharge reed 21 having the slit 65 to cut off the suction force of the lubricating oil 2 with respect to the spring reed 30 is smaller than a load Y applied to the conventional discharge reed. As a result, a load required for the discharge reed 21 to move away from the spring reed 30 and close the discharge hole 19 is reduced, and energy necessary for closing the discharge hole 19 is reduced. Since it becomes possible to avoid a situation in which the discharge hole 19 is closed at a later timing, re-inflow of the working fluid 3 into the compression chamber 13 is suppressed. Thus, a reduction of a refrigeration capability of the sealed compressor can be mitigated.

Figure 23A:
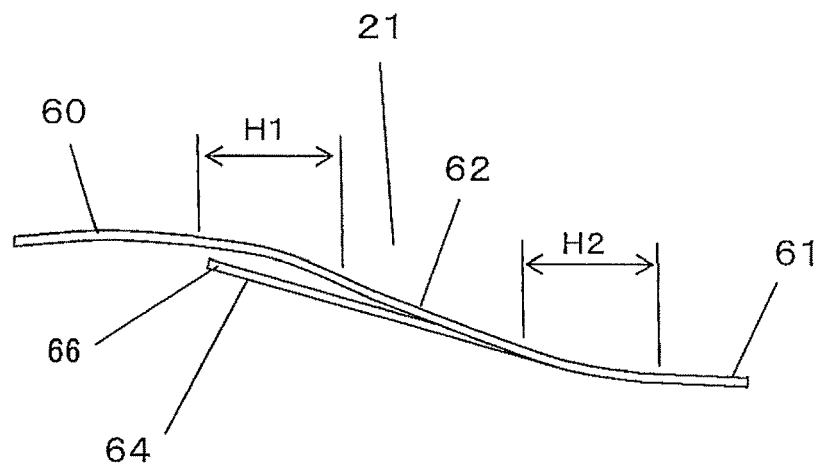
FIG. 23A is a side view schematically showing a stress generated in the discharge reed deformed in the state of FIG. 21C.
Figure 23B:
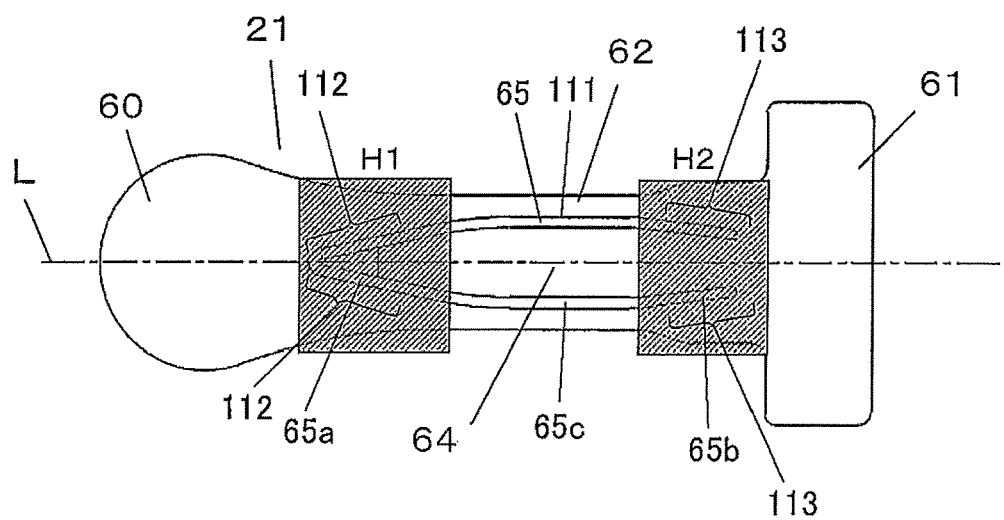
FIG. 23B is a plan view schematically showing the stress generated in the discharge reed of FIG. 23A.

A stress generated in the discharge reed 21 of Embodiment 3 is similar to the stress generated in the discharge reed 21 of Embodiment 1 and Embodiment 2, as shown in FIG. 23A and FIG. 23B. FIG. 23A is a side view showing the deformed discharge reed 21. FIG. 23B is a plan view showing the deformed discharge reed 21.

Specifically, when the discharge reed 21 is displaced to a greatest degree and deformed in a S-shape, the fastened section 61 is fastened by the fastened section 30b of the spring reed 30, and a displacement of the opening/closing section 60 of the discharge reed 21 is limited by the movable section 30a and the limiting section 31b. Therefore, at a portion of H1 and a portion of H2, the joining section 62 of the discharge reed 21 is likely to be bent to a great degree.

As shown in FIG. 23B, a width of the discharge reed 21 in the range of the portion of H1 and the portion of H2, is greater than a width of the discharge reed 21 in the range of the intermediate portion 65c. Therefore, a spring constant and bending strength of the discharge reed 21 in the range of the portion of H1 and the portion of H2 are greater, and a spring constant of the discharge reed 21 in a portion between the portion of H1 and the portion of H2 is smaller. Therefore, the discharge reed 21 is not fractured and a reduction of a durability of the discharge reed 21 is prevented.

[Modified Example 11]

Figure 24:
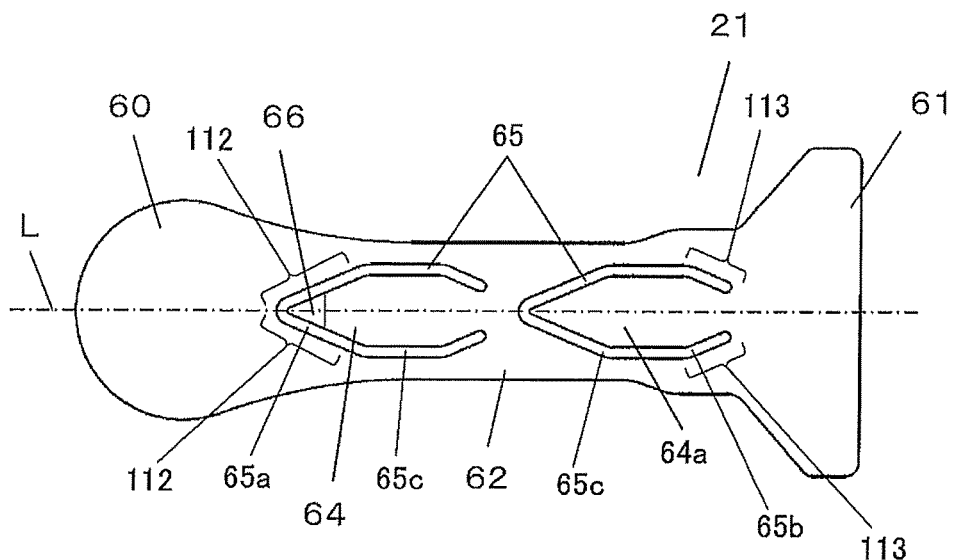
FIG. 24 is a plan view showing a discharge reed according to Modified example 11 of Embodiment 3.

Although the discharge reed 21 of FIG. 19 has one slit 65, the number of slits 65 is not limited to this, and the discharge reed 21 may be provided with a plurality of slits 65. For example, as shown in FIG. 24, two slits 65 are arranged, in the direction of the symmetric axis L. In this case, the contact portion 66 is provided at the tongue-shaped section 64 in a location closer to the opening/closing section 60. The two slits 65 are formed by two slits 65. A blank is provided between these two slits 65. Since the two slits 65 can be assumed as one slit 65 which is unitarily joined together, the same advantages as those of FIG. 19 can be achieved.

[Modified Example 12]

Although the slit 65 of the discharge reed 21 of FIG. 19 includes the opening/closing section side portion 65a, the fastened section side portion 65b and the intermediate portion 65c, the shape of the slit 65 is not limited to this. It is sufficient that the slit 65 has a shape which is symmetric with respect to the symmetric axis L and is narrow in the range of both ends in the direction of the symmetric axis L. For example, the slit 65 may have a rhombus shape or an oval shape.

[Modified Example 13]

Although the length of the tongue-shaped section 64 of the discharge reed 21 of FIG. 19 in the direction of the symmetric axis L, is greater than the width of the opening/closing section 60 which is in the direction perpendicular to the symmetric axis L, it may be equal to or smaller than the width of the opening/closing section 60 in the direction perpendicular to the symmetric axis L. In this case, the same advantages as those of Modified example 8 can be achieved.

[Modified Example 14]

Figure 25:
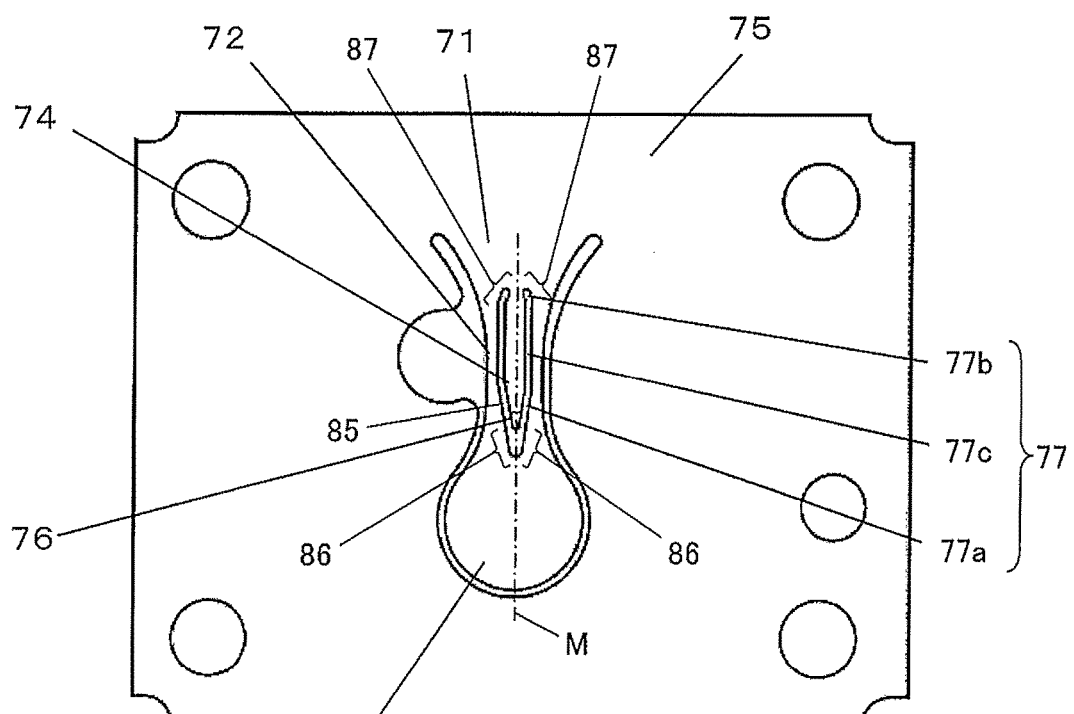
FIG. 25 is a plan view showing a suction reed according to Modified example 14 of Embodiment 3.

Although the discharge reed 21 of FIG. 19 has the slit 65, the suction reed 75 of FIG. 25 may have the slit 77. The suction reed 75 is similar to the suction reed 75 of Modified example 9 and can achieve similar advantages. The tongue-shaped section 74 of the suction reed 75 is bent to bias the suction reed 75 so that the suction reed 75 opens. The contact portion 76 is provided at the tip end portion of the tongue-shaped section 74. By the elastic force of the tongue-shaped section 74, the contact portion 76 of the tongue-shaped section 74 contacts the valve plate 17 before the opening/closing section 70 of the suction reed 75 contacts the valve plate 17. Thus, it becomes possible to mitigate an impact generated when the opening/closing section 70 contacts the valve plate 17. Therefore, a noise of an impact generated when the opening/closing section 70 contacts the valve plate 17 can be mitigated, and a noise generated during actuation of the compressor can be mitigated.

[Modified Example 15]

As shown in FIG. 18, the valve device includes the valve plate 17, the discharge reed 21, the spring reed 30 and the valve stop 31. Alternatively, the valve device may not include the spring reed 30, but may include the valve plate 17, the discharge reed 21 and the valve stop 31. In this case, the valve stop 31 directly defines a greatest opening degree of the discharge reed 21. For example, the valve stop 31 which is similar to the valve stop 31 of FIGS. 10A and 10B is used.

[Modified Example 16]

Although the contact portion 66 is provided at the tip end portion of the tongue-shaped section 64, it may not be provided at the tongue-shaped section 64.

[Modified Example 17]

In the example of FIGS. 12, 19, 24 and 25, open portions of the C-shaped slits 65, 67 may be provided at an opposite side in the direction in which the symmetric axis L, M extends.

The above described embodiments may be combined so long as they do not exclude each other. For example, in a case where the discharge reed 21 is provided with a plurality of openings in the direction in which the symmetric axis L extends, some of the plurality of openings may be wide openings 63 and the remaining openings may be narrow slits 65.

The invention will be apparent to those skilled in the art in view of the foregoing description. Accordingly, the description is to be construed as illustrative only, and is provided for the purpose of teaching those skilled in the art the best mode of carrying out the invention. The details of the structure and/or function may be varied substantially without departing from the spirit of the invention and all modifications which come within the scope of the appended claims are reserved.

INDUSTRIAL APPLICABILITY

A valve device of a compressor of the present invention and a sealed compressor including the valve device are useful as a valve device of a compressor, a sealed compressor including the valve device, and the like, which can mitigate a reduction of a durability while lessening energy consumption.

REFERENCE SIGNS LIST

1 sealed container
6 electric component
9 compression component
13 compression chamber
15 cylinder block (block)
16 piston
17 valve plate (plate)
18 suction hole (communication hole)
19 discharge hole (communication hole)
21 discharge reed (reed)
30 spring reed
31 valve stop (stopper)
60 opening/closing section
61 fastened section
62 joining section
63 opening
64 tongue-shaped section
65 slit
70 opening/closing section
71 fastened section
72 joining section
75 suction reed (reed)

The invention claimed is:

1. A valve device of a compressor, comprising:
a plate having a communication hole communicated with a compression chamber within which a piston is reciprocatable;
a plate-shaped reed for opening and closing the communication hole; and
a stopper which is disposed to cover the reed and defines an opening degree of the reed;
wherein the reed includes:
an opening/closing section positioned on an opening of the communication hole;

a fastened section fastened to the plate; and a joining section for joining the opening/closing section to the fastened section, the joining section having two openings, the opening/closing section, the fastened section and the joining section being arranged in a direction in which a symmetric axis extends;

wherein in a portion of the joining section which is closer to the opening/closing section, a pair of first outer peripheral portions of an outer periphery of each of the two openings which are closest to both ends of the joining section are symmetric with respect to the symmetric axis so as to form a substantially-V-shape or substantially-U-shape, in a direction from the opening/closing section toward the fastened section; and in a portion of the joining section which is closer to the fastened section, a pair of second outer peripheral portions of the outer periphery of each of the two openings which are closest to the both ends of the joining section are symmetric with respect to the symmetric axis so as to form a substantially-V-shape or substantially-U-shape, in a direction from the fastened section toward the opening/closing section, wherein a length of each of the two openings in a direction parallel to the symmetric axis is smaller than a length of the opening/closing section in a direction perpendicular to the symmetric axis, the pair of first outer peripheral portions are symmetric with respect to the symmetric axis so as to form a substantially-V-shape or substantially-U-shape such that a distance between the pair of first outer peripheral portions in the direction perpendicular to the symmetric axis gradually increases, and the pair of second outer peripheral portions are symmetric with respect to the symmetric axis so as to form the substantially-V-shape or substantially-U-shape such that a distance between the pair of second outer peripheral portions in the direction perpendicular to the symmetric axis gradually increases.

2. The valve device of the compressor according to claim 1, wherein the pair of first outer peripheral portions and the pair of second outer peripheral portions are respectively separate end portions of the outer peripheries for each opening of the two openings extending to cross the symmetric axis.

3. The valve device of the compressor according to claim 2, wherein the opening is a wide hole in which the outer periphery of the opening includes the pair of first outer peripheral portions and portions extending toward the pair of first outer peripheral portions such that the portions are symmetric with respect to the symmetric axis so as to form a substantially-V-shape or substantially-U-shape, the outer periphery of the opening includes the pair of second outer peripheral portions and portions extending toward the pair of second outer peripheral portions such that the portions are symmetric with respect to the symmetric axis so as to form a substantially-V-shape or substantially-U-shape, or the opening is a wide hole in which the outer periphery of the opening includes the pair of first outer peripheral portions and the pair of second outer peripheral portions.

4. The valve device of the compressor according to claim 2, wherein the opening is a narrow hole in which the outer periphery of the opening includes the pair of first outer peripheral portions and a portion extending in parallel with the pair of first outer peripheral portions, and/or the pair of second outer peripheral portions and a portion extending in parallel with the pair of second outer peripheral portions.

5. The valve device of the compressor according to claim 4, wherein the narrow hole has a shape in which a portion which is closer to the opening/closing section extends to cross the symmetric axis, and a tongue-shaped section surrounded by the narrow hole is bent toward the plate.

6. The valve device of the compressor according to claim 1, further comprising:

a plate-shaped spring reed disposed between the reed and the stopper;

wherein one end portion of the spring reed is fastened to the plate, and the other end portion of the spring reed is positioned in a region in which the opening/closing section of the reed is movable, and the stopper indirectly limits an opening degree of the reed via the spring reed.

7. The valve device of the compressor according to claim 1, wherein the plate has a recess, wherein the communication hole is formed through a bottom of the recess;

the plate-shaped reed is provided within the recess, the reed is manufactured as a single member, and the reed is retained by the stopper being pushed into the recess of the plate.

8. A sealed compressor comprising:

a compression component including the valve device of the compressor as recited in claim 1, the piston, and a block provided with the compression chamber;

an electric component for actuating the piston; and a sealed container accommodating the electric component and the compression component.

* * * * *